(12) United States Patent
Rofougaran et al.

(10) Patent No.: US 7,844,242 B2
(45) Date of Patent: Nov. 30, 2010

(54) WIRELESS COMMUNICATION DEVICE WITH PROGRAMMABLE ANTENNA SYSTEM

(75) Inventors: Ahmadreza (Reza) Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 916 days.

(21) Appl. No.: 11/729,270

(22) Filed: Mar. 28, 2007

(65) Prior Publication Data

US 2008/0242346 A1  Oct. 2, 2008

(51) Int. Cl.
*H04B 1/28* (2006.01)
(52) U.S. Cl. .............. 455/333; 455/334; 455/552.1
(58) Field of Classification Search ........... 455/323, 455/333, 334, 550.1, 552.1
See application file for complete search history.

(56) References Cited

U.S. PATENT DOCUMENTS

| | | | |
|---|---|---|---|
| 7,330,740 B2* | 2/2008 | Bennett et al. | 455/574 |
| 7,421,250 B2* | 9/2008 | Shi | 455/73 |
| 7,623,830 B2* | 11/2009 | Rofougaran | 455/73 |
| 7,729,722 B2* | 6/2010 | Rofougaran et al. | 455/550.1 |
| 2008/0009258 A1* | 1/2008 | Safarian et al. | 455/307 |
| 2008/0079509 A1* | 4/2008 | Serrano et al. | 331/175 |

* cited by examiner

*Primary Examiner*—Nhan Le
(74) *Attorney, Agent, or Firm*—Garlick Harrison & Markison; Timothy W. Markison

(57) ABSTRACT

A wireless communication device includes an integrated circuit (IC) and an antenna system. The IC includes a processing module and a transceiver section. The processing module establishes a wireless communication protocol, converts outbound data into an outbound symbol stream, converts an inbound symbol stream into inbound data, and establishes operational parameters. The transceiver section converts an inbound RF signal into the inbound symbol stream and converts the outbound symbol stream into an outbound RF signal. The antenna system provides a plurality of antenna structures corresponding to the plurality of operational modes of the wireless communication device, wherein the antenna system provides one of the plurality of antenna structures in accordance with the operational parameters to transceive the inbound and outbound RF signals.

15 Claims, 16 Drawing Sheets

WIRELESS COMMUNICATION DEVICE WITH PROGRAMMABLE ANTENNA SYSTEM

This patent application is claiming priority under 35 USC §119 to a provisionally filed patent application entitled WIRELESS COMMUNICATION DEVICE WITH PROGRAMMABLE ANTENNA SYSTEM, having a provisional filing date of Mar. 14, 2007, and a provisional Ser. No. of 60/906,986.

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to wireless communication devices having an integrated circuit operating within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As a further example, the resulting RF signal has different carrier frequencies in different frequency bands depending on the standard being supported by the transceiver. For instance, a GSM, EDGE, or GPRS compliant transceiver uses a 900 MHz, 1800 MHz, and/or 1900 MHz frequency band; a WCMA compliant transceiver uses a 1900 MHz and 2100 MHz frequency band; an IEEE 802.11 compliant transceiver uses a 2.4 GHz or 5 GHz frequency band; and a Bluetooth compliant transceiver uses a 2.4 GHz frequency band. As such, the local oscillation, the mixers of the transmit and receive IF stages, the low noise amplifier, the power amplifier, and the RF filtering are designed to operating within a specific frequency band.

As the desire for wireless communication devices to support multiple standards continues, recent trends include the desire to integrate more functions on to a single chip. However, such desires have gone unrealized when it comes to implementing baseband and RF on the same chip for multiple wireless communication standards.

Therefore, a need exists for an integrated circuit (IC) that implements baseband and RF of multiple wireless communication standards on the same IC die.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
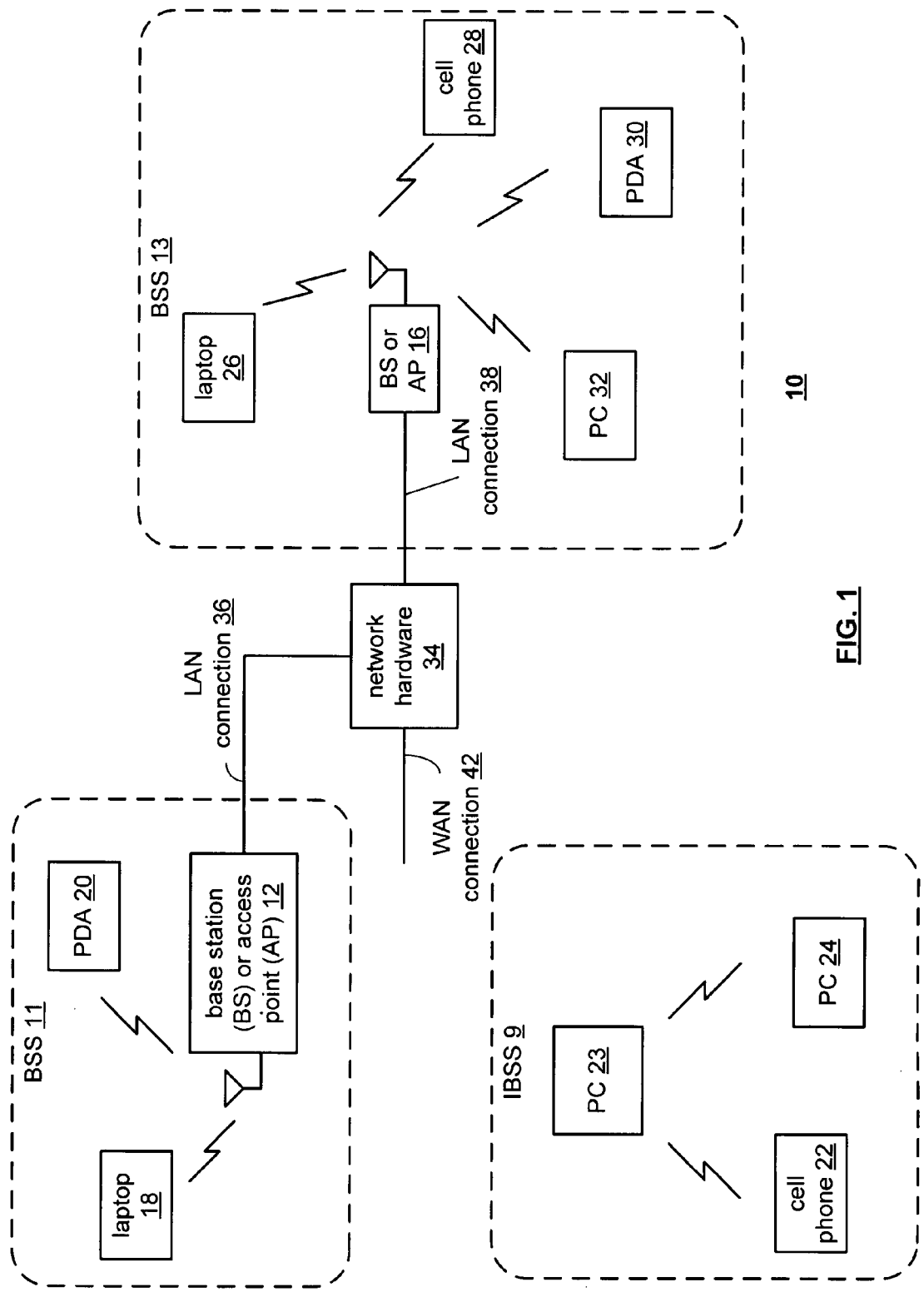
FIG. 1 is a schematic block diagram of an embodiment of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIGS. 2-13.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
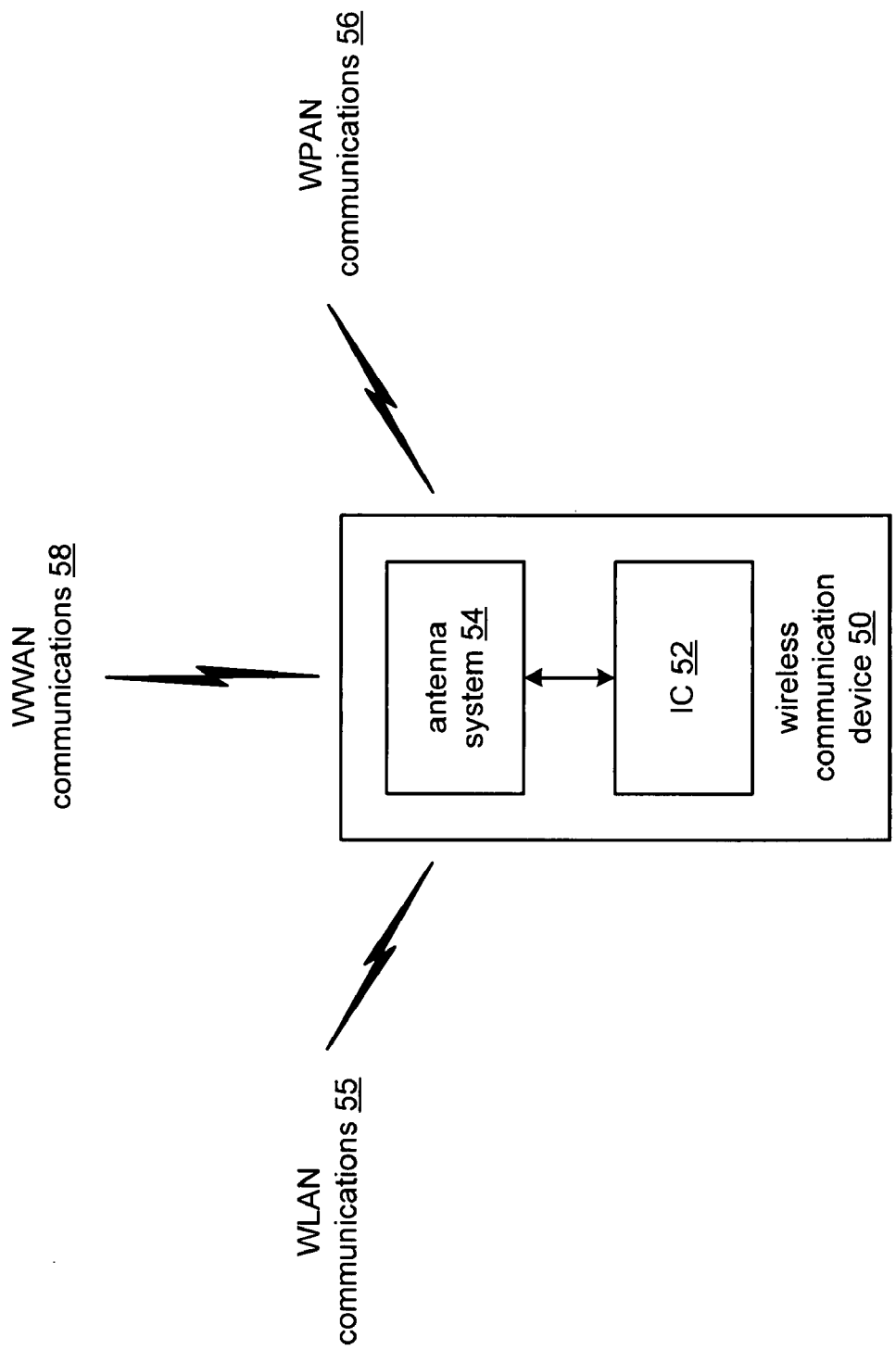
FIG. 2 is a schematic block diagram of an embodiment of a wireless communication device in accordance with the present invention.

FIG. 2 is a schematic block diagram of an embodiment of a wireless communication device 50 that includes an integrated circuit 52 and an antenna system 54. The communication device 50 may be one of the communication devices 18-32 of FIG. 1 or another type of portable device that provides wireless services. In this embodiment, the wireless communication device 50 supports one or more of wireless local area network (WLAN) communications 55, wireless personal area network (WPAN) communications 56, and wireless wide area network (WWAN) communications 58.

The WLAN communications 55 may be in accordance with past, present, or future versions of IEEE 802.11 (e.g., 802.11a, b, g, n, etc.). In addition, the WLAN communications 55 may be in accordance with a far field communication (FFC) protocol as may be used in an RFID system. For example, the wireless communication device 50 may include an RFID reader that communicates with RFID tags within its coverage area via an RF signal having a carrier frequency at 13 MHz, 900 MHz, etc., using a back-scattering technique. Alternatively, the wireless communication device 50 may included an RFID tag.

The WPAN communications 56 may be in accordance with past, present, or future versions of Bluetooth, ZigBee, and/or IEEE 802.15x (e.g., IEEE 802.15.1, 0.2, 0.3, and 0.4). In addition, the WPAN communications 56 may be in accordance with a near field communication (NFC) protocol as may be used in an RFID system, card reading system, chip reading system, etc. For example, the WPAN communications 56 may be with a headset, a wireless mouse, a wireless keypad, a wireless keyboard, etc.

The WWAN communications 58 may be in accordance with past, present, or future versions of cellular voice standards (e.g., global system for mobile communications (GSM), wide bandwidth code division multiplexing (WCDMA), CDMA), cellular data standards (e.g., high-speed downlink packet access (HSDPA), high-speed uplink packet access (HSUPA), Enhanced Data rates for GSM Evolution (EDGE), General Packet Radio Service (GPRS)), broadcast television standards (e.g., digital video broadcasting—handheld (DVB-H), digital multimedia broadcasting (DMB)), broadcast radio (e.g., FM), and/or global positioning system (GPS) standards.

Figure 3:
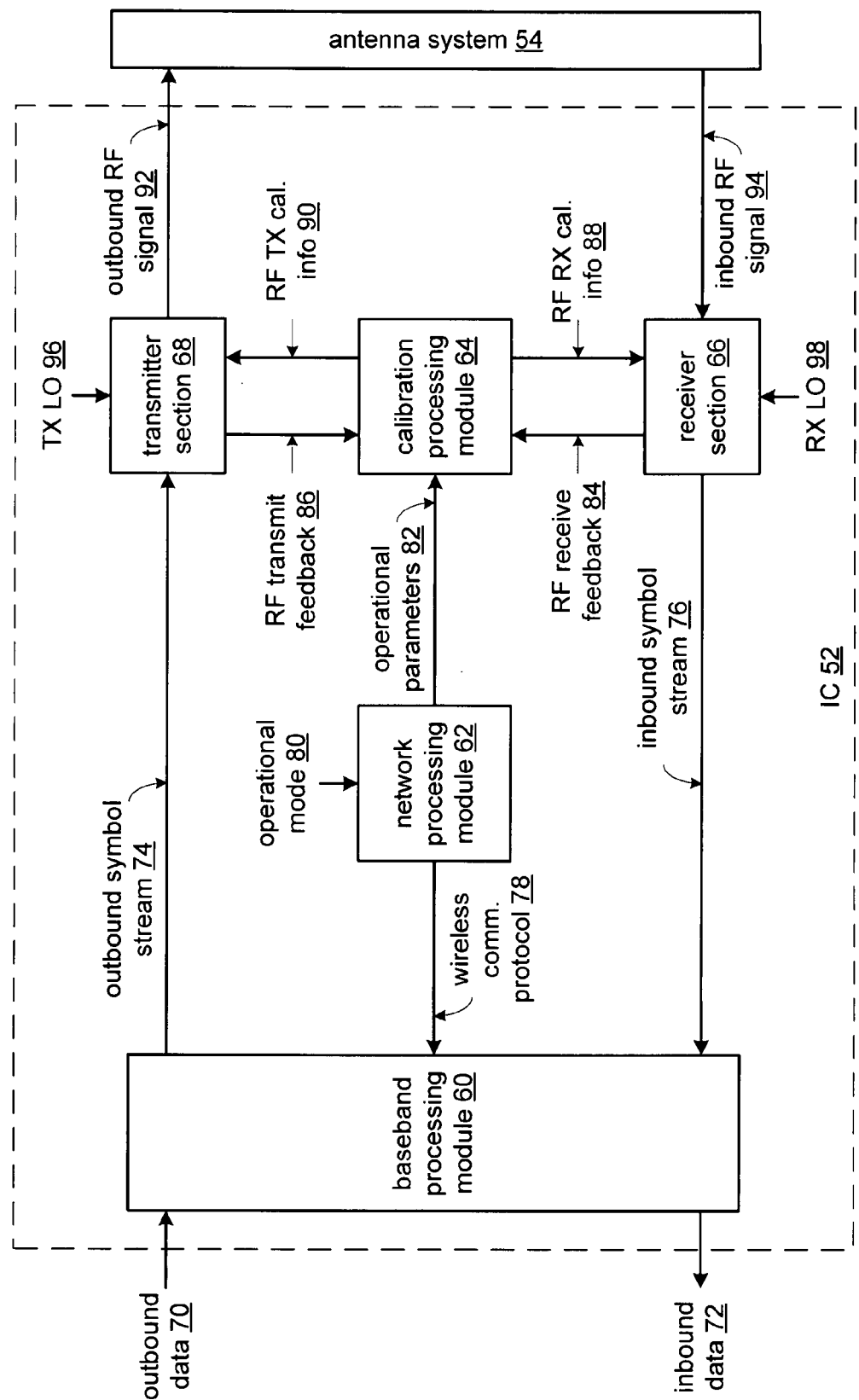
FIG. 3 is a schematic block diagram of another embodiment of a wireless communication device in accordance with the present invention.

FIG. 3 is a schematic block diagram of another embodiment of a wireless communication device 50 that includes the IC 52 and the antenna system 54. In this embodiment, the IC 52 includes a baseband processing module 60, a network processing module 62, a calibration processing module 64, a receiver section 66, and a transmitter section 68. The baseband processing module 60, the network processing module 62, and the calibration processing module 64 may be separate processing modules, a shared processing module, or a combination thereof. The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 3-19.

In operation, the network processing module 62 establishes a wireless communication protocol 78 in accordance with an operational mode 80 of the wireless communication device. The wireless communication protocol 78 may be one or more of a WLAN communication protocol (e.g., IEEE 802.11x, FFC), a WPAN communication protocol (e.g., Bluetooth, ZigBee, IEEE 802.15x, NFC) and a WWAN communication protocol (e.g., GSM, EDGE, GPRS, WCDMA, CDMA, HSDPA, HSUPA, DVB-H, DMB, GPS, FM). Note that the network processing module 62 may automatically detect the operational mode 80 and/or detect the operational mode 80 based on a user selection.

The network processing module 62 also establishes operational parameters 82 based on the wireless communication protocol 78. The operational parameters 82 may includes limits and/or specific values for one or more of frequency bands, channels, gain settings, filter corner frequency or frequencies, filter attenuation roll-off, bandwidth, center frequency, quality factor, frequency dependent impedance value, attenuation setting, gain roll-off, transmit power settings, antenna configuration settings, and frequency response. Note that the operational parameters 82 may include default settings and/or include calculated settings for one or more of the parameters as will be further described with reference to FIG. 6.

As an example, assume that the mode of operation 80 is WLAN and the wireless communication protocol is IEEE 802.11g. In this example, the operational parameters 82 indicate initial values and/or ranges of values for one or more of: a frequency band of 2.4 GHz, oscillation settings for the transmit and receive local oscillations 96 and 98 (e.g., 2.4 GHz for direct conversion in this example), LNA settings (e.g., gain, input impedance, frequency response, load, bandwidth, etc.), antenna matching settings (e.g., impedance, frequency response, bandwidth, quality factor, center frequency, etc.) for the receiver and transmitter sections 66 and 68, the antenna configuration settings (e.g., antenna configuration, frequency response, quality factor, impedance, bandwidth, center frequency, etc.), RF filtering settings (gain/attenuation value, bandwidth, roll-off, corner frequency(ies), etc.), analog filtering settings (e.g., gain/attenuation value, bandwidth, roll-off, corner frequency(ies), etc.), transmitter RF signal processing (e.g., beamforming, antenna polarization, maximum signal to noise ratio, and maximum signal to interference ratio, etc.), PA settings (e.g., gain, output impedance, frequency response, load, bandwidth, transmit power level, etc.), and up-conversion and/or down conversion mixer settings (e.g., gain, load, frequency response, etc.). Thus, the wireless communication device 50 is initialized and/or operates in accordance with the operational parameters 82.

In another embodiment, the calibration processing module 64 providing the RF receive feedback 84 and the RF transmit feedback 86 to the network processing module 62. The network processing module 62 utilizes the RF receive feedback 84 and the RF transmit feedback 86 in addition to the wireless communication protocol 78 to establish the operational parameters 82.

The calibration processing module 84 receives the operational parameters 82 and receives feedback from the receiver section 66 and the transmitter section 68 (e.g., RF receive feedback 84 and RF transmit feedback 86, respectively). The RF receive feedback 84 may include one or more of: received signal strength indication (RSSI), receive antenna matching performance indication (e.g., measurements indicative of impedance, frequency response, bandwidth, quality factor, center frequency, etc.), LNA performance indication (e.g., measurements indicative of gain, input impedance, frequency response, bandwidth, loading, etc.), receiver RF filtering performance indication (e.g., measurements indicative of gain/attenuation, bandwidth, roll-off, corner frequency(ies), etc.), down-conversion performance indication (e.g., measurements indicative of gain, load, frequency response, etc.), and receive analog filtering performance indication (e.g., gain/attenuation value, bandwidth, roll-off, corner frequency(ies), etc.). The RF transmit feedback 86 may include one or more of: a transmit power level indication, transmit antenna matching performance indication (e.g., measurements indicative of impedance, frequency response, bandwidth, quality factor, center frequency, etc.), PA performance indication (e.g., measurements indicative of gain, input impedance, frequency response, bandwidth, transmit power level, linearity, loading, etc.), transmit RF filtering performance indication (e.g., measurements indicative of gain/attenuation, bandwidth, roll-off, corner frequency(ies), etc.), up-conversion performance indication (e.g., measurements indicative of gain, load, frequency response, etc.), and transmit analog filtering performance indication (e.g., gain/attenuation value, bandwidth, roll-off, corner frequency(ies), etc.).

The calibration processing module 84 uses the operational parameters 82 and the RF receive feedback 84 to generate RF receiver calibration information 88. In an embodiment, the calibration processing module 84 utilizes the operational parameters 82 to determine desired performance levels of the receiver section 66 and uses the RF receive feedback 84 to determine actual performance levels. The calibration processing module 84 determines differences between the desired performance levels and the actual performance levels to generate the RF receiver calibration information 88. The RF receiver calibration information 88 may include one or more of: default settings for one or more components of the receiver section 66, new or adjusted LNA settings, new or adjusted antenna matching settings, new or adjusted antenna configuration settings, new or adjusted RF filtering settings, new or adjusted analog filtering settings, and new or adjusted down conversion mixer settings.

The calibration processing module 84 also uses the operational parameters 82 and the RF transmit feedback 86 to generate RF transmitter calibration information 90. In an embodiment, the calibration processing module 84 utilizes the operational parameters 82 to determine desired performance levels of the transmitter section 6 and uses the RF transmit feedback 8 to determine actual performance levels. The calibration processing module 84 determines differences between the desired performance levels and the actual performance levels to generate the RF transmitter calibration information 90. The RF transmitter calibration information 90 may include one or more of: default settings for one or more components of the transmitter section 68, new or adjusted PA settings, new or adjusted antenna matching settings, new or adjusted antenna configuration settings, new or adjusted RF filtering settings, new or adjusted analog filtering settings, and new or adjusted up-conversion mixer settings.

The baseband processing module 60 converts outbound data 70 (e.g., digitized voice, data, text, image file, audio file, video file, etc.) into an outbound symbol stream 74 in accordance with the wireless communication protocol 78. The particular type of processing performed by the baseband processing module 60 is dependent upon the wireless communication protocol 78 and may include, but is not limited to, scrambling, encoding, puncturing, constellation mapping, PSK modulation, GMSK modulation, QPSK modulation, FSK modulation, 8-PSK modulation, n-QAM modulation, and/or digital baseband to IF conversion.

The baseband processing module 60 also converts an inbound symbol stream 76 into inbound data 72 (e.g., digitized voice, data, text, image file, audio file, video file, GPS signals, digitized FM audio, digital video broadcast, etc.) in accordance with the wireless communication protocol 78. The particular type of processing performed by the baseband processing module 60 is dependent upon the wireless communication protocol 78 and may include, but is not limited to, descrambling, decoding, depuncturing, constellation demapping, PSK demodulation, GMSK demodulation, QPSK demodulation, FSK demodulation, 8-PSK demodulation, n-QAM demodulation, and/or IF to digital baseband conversion.

The receiver section 66 (embodiments of which will be described in greater detail with reference to FIGS. 5 and 6) provides the RF receive feedback 84 and converts an inbound RF signal 94 into the inbound symbol stream 76 in accordance with the RF receiver calibration information 88 and a receive local oscillation 98. The conversion performed by the receiver section 66 is dependent upon the wireless communication protocol. For example, if the wireless communication protocol utilizes Gaussian Minimum Shift Keying (GMSK) scheme, the receiver section 66 includes a GMSK receiver architecture to recover a GMSK modulated signal (e.g., the inbound symbol stream 76) from the inbound RF signal 94. As another example, if the wireless communication protocol utilizes an 8-PSK (phase shift keying) scheme and/or an x-QAM scheme, the receiver section 66 includes an 8-PSK or x-QAM receiver architecture to recover an 8-PSK or x-QAM modulated signal (e.g., the inbound symbol stream 76) from the inbound RF signal 94.

The transmitter section 68 (embodiments of which will be described in greater detail with reference to FIGS. 5 and 6) provides the RF transmit feedback 86 and converts the outbound symbol stream 74 into an outbound RF signal 92 in accordance with the RF transmitter calibration information 90 and a transmit local oscillation 96. The conversion performed by the transmitter section 68 is dependent upon the wireless communication protocol. For example, if the wireless communication protocol utilizes a GMSK scheme, the transmitter section 68 includes a GMSK transmitter architecture to convert a GMSK modulated signal (e.g., the outbound symbol stream 76) into the outbound RF signal 92. As another example, if the wireless communication protocol utilizes an 8-PSK (phase shift keying) scheme and/or an x-QAM scheme, the transmitter section 68 includes an 8-PSK or x-QAM transmitter architecture to convert an 8-PSK or x-QAM modulated signal (e.g., the outbound symbol stream 76) into the outbound RF signal 92.

The antenna system 54 (embodiments of which are described in greater detail with reference to FIGS. 8-19) provides the inbound RF signal 94 to the receiver section 66 and receives the outbound RF signal 92 from the transmitter section 68. The antenna section 54 then transmits the outbound RF signal 92.

Figure 4:
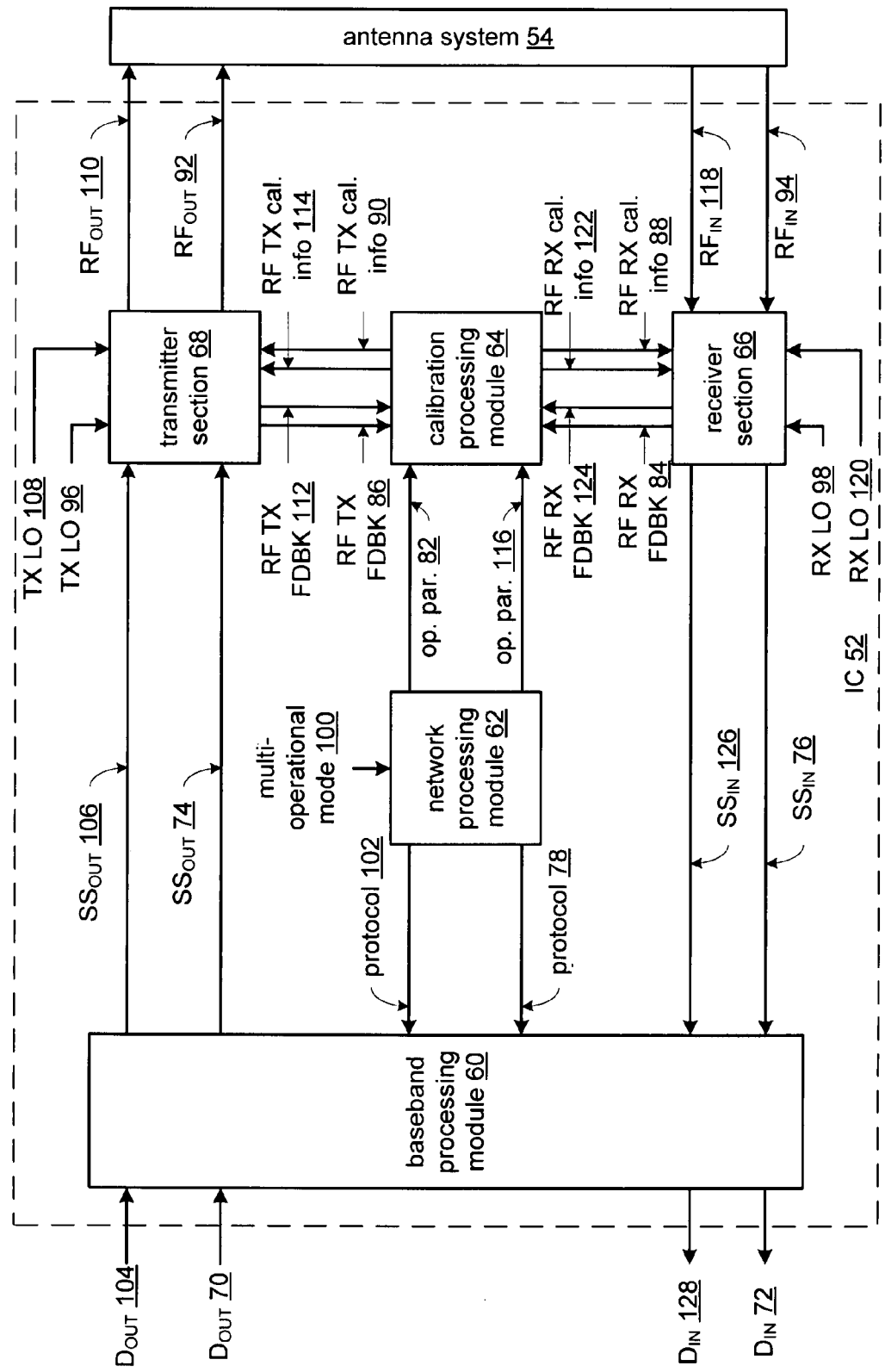
FIG. 4 is a schematic block diagram of another embodiment of a wireless communication device in accordance with the present invention.

FIG. 4 is a schematic block diagram of another embodiment of a wireless communication device 50 that includes the IC 52 and the antenna system 54. The IC 52 includes the baseband processing module 60, the network processing module 62, the calibration processing module 64, the receiver section 66, and the transmitter section 68. The baseband processing module 60, the network processing module 62, and the calibration processing module 64 may be separate processing modules, a shared processing module, or a combination thereof.

In this embodiment, the wireless communication device 50 is in a multi-system operational mode 100 (e.g., supporting two or more wireless communication protocols concurrent operations and/or contemporaneous operations). In this embodiment, the network processing module 62 establishes first and second wireless communication protocols 78 and 102 in accordance with a concurrent operational mode 100 of the wireless communication device 50. Note that the first and second wireless communication protocols 78 and 102 may each be one or more of a WLAN communication protocol (e.g., IEEE 802.11x, FFC), a WPAN communication protocol (e.g., Bluetooth, ZigBee, IEEE 802.15x, NFC) and a WWAN communication protocol (e.g., GSM, EDGE, GPRS, WCDMA, CDMA, HSDPA, HSUPA, DVB-H, DMB, GPS, FM).

The network processing module 62 also establishes first operational parameters 82 based on the first wireless communication protocol 78 and establishes second operational parameters 116 based on the second wireless communication protocol 102. The first and second operational parameters 82 and 116 may be one or more of the operational parameters 82 discussed with reference to FIG. 3.

The baseband processing module 60 converts first outbound data 70 into a first outbound symbol stream 74 in accordance with a first wireless communication protocol 78 and converts a first inbound symbol stream 76 into first inbound data 72 in accordance with the first wireless communication protocol 78. The baseband processing module 60 also converts second outbound data 104 (e.g., digitized voice, data, text, image file, audio file, video file, etc.) into a second outbound symbol stream 106 in accordance with a second wireless communication protocol 102 and convert a second inbound symbol stream 126 into second inbound data 128 (e.g., digitized voice, data, text, image file, audio file, video file, GPS signals, digitized FM audio, digital video broadcast, etc.) in accordance with the second wireless communication protocol 102.

The calibration processing module 64 is coupled to receive first RF receive feedback 84 corresponding to the first wireless communication protocol 78; receive second RF receive feedback 124 corresponding to the second wireless communication protocol 102; receive first RF transmit feedback 86 corresponding to the first wireless communication protocol 78; and receive second RF transmit feedback 112 corresponding to the second wireless communication protocol 102. The second RF transmit and receive feedback may be similar in scope to the first RF transmit and receive feedback discussed with reference to FIG. 3.

The calibration processing module 64 is also coupled to generate first RF receiver calibration information 88 based on the first operational parameters 82 and the first RF receive feedback 84; generate second RF receiver calibration information 122 based on the second operational parameters 116 and the second RF receive feedback 124; generate first RF transmitter calibration information 90 based on the first operational parameters 82 and the first RF transmit feedback 86; and generate second RF transmitter calibration information 122 based on the second operational parameters 116 and the second RF transmit feedback 112. The second RF RX and TX calibration information 122 and 114 may be similar in scope to the first RF RX and TX calibration information 88 and 90 discussed with reference to FIG. 3.

The receiver section 66 provides the first and second RF receive feedback 84 and 124 to the calibration module 64. The receiver section 66 also converts a first inbound RF signal 94 into the first inbound symbol stream 76 in accordance with the first RF receiver calibration information 88 and a first receive local oscillation 98. The receiver section 66 further converts a second inbound RF signal 118 into the second inbound symbol stream 126 in accordance with the second RF receiver calibration information 122 and a second receive local oscillation 120.

The transmitter section 68 provides the first and second RF transmit feedback 86 and 112 to the calibration processing module 64. In addition, the transmitter section 68 converts the first outbound symbol stream 74 into a first outbound RF signal 92 in accordance with the first RF transmitter calibration information 90 and a first transmit local oscillation 96. The transmitter section 68 also converts the second outbound symbol stream 106 into a second outbound RF signal 110 in accordance with the second RF transmitter calibration information 114 and a second transmit local oscillation 108.

In another embodiment, the network processing module 62 may determine whether the first and second wireless communication protocols 78 and 102 have at least partially overlapping frequency bands. For example, the network processing module 62 may determine that the first wireless communication protocol 78 is EDGE operating in the 1900 MHz frequency band and the second communication protocol is WCDMA operating in the 1900 MHz and 2100 MHz frequency bands.

If the first and second wireless communication protocols have at least partially overlapping frequency bands, the network processing module 62 determines whether the first outbound RF signal will interfere with the second inbound RF signal or whether the second outbound RF signal will interfere with the first inbound RF signal. Such a determination may be made by intrinsic data or empirical data. For example, the network processing module 62 determines whether the EDGE RF signals will interfere with the WCDMA RF signals, and vice versa. Since both use the 1900 MHz frequency band, it can be assumed that the EDGE and WCDMA RF signals will interfere with each other if simultaneously operated. However, by using a polarized antenna structure, selective RF filtering, and selective baseband processing, it is possible for simultaneous EDGE and WCDMA operation. Alternatively, simultaneous operation of the EDGE and WCDMA may occur via a nested sharing of the appropriate RF resources, where one of the protocols reserves the RF resources and allocates part of its granted RF resources to the other protocol.

If the first outbound RF signal will interfere with the second inbound RF signal or if the second outbound RF signal will interfere with the first inbound RF signal, the network processing module 62 establishes an RF resource sharing protocol between the first and second wireless communication protocols. The RF resource sharing protocol may include time division multiplexing, frequency division multiplexing, a round robin scheme, a collision sense multiple access (CSMA) with collision avoidance, etc. Note that the RF resource(s) being shared may be one or more channels within a frequency band, a particular carrier frequency within the frequency band, and/or multiple carrier frequencies within the frequency band.

Figure 5:
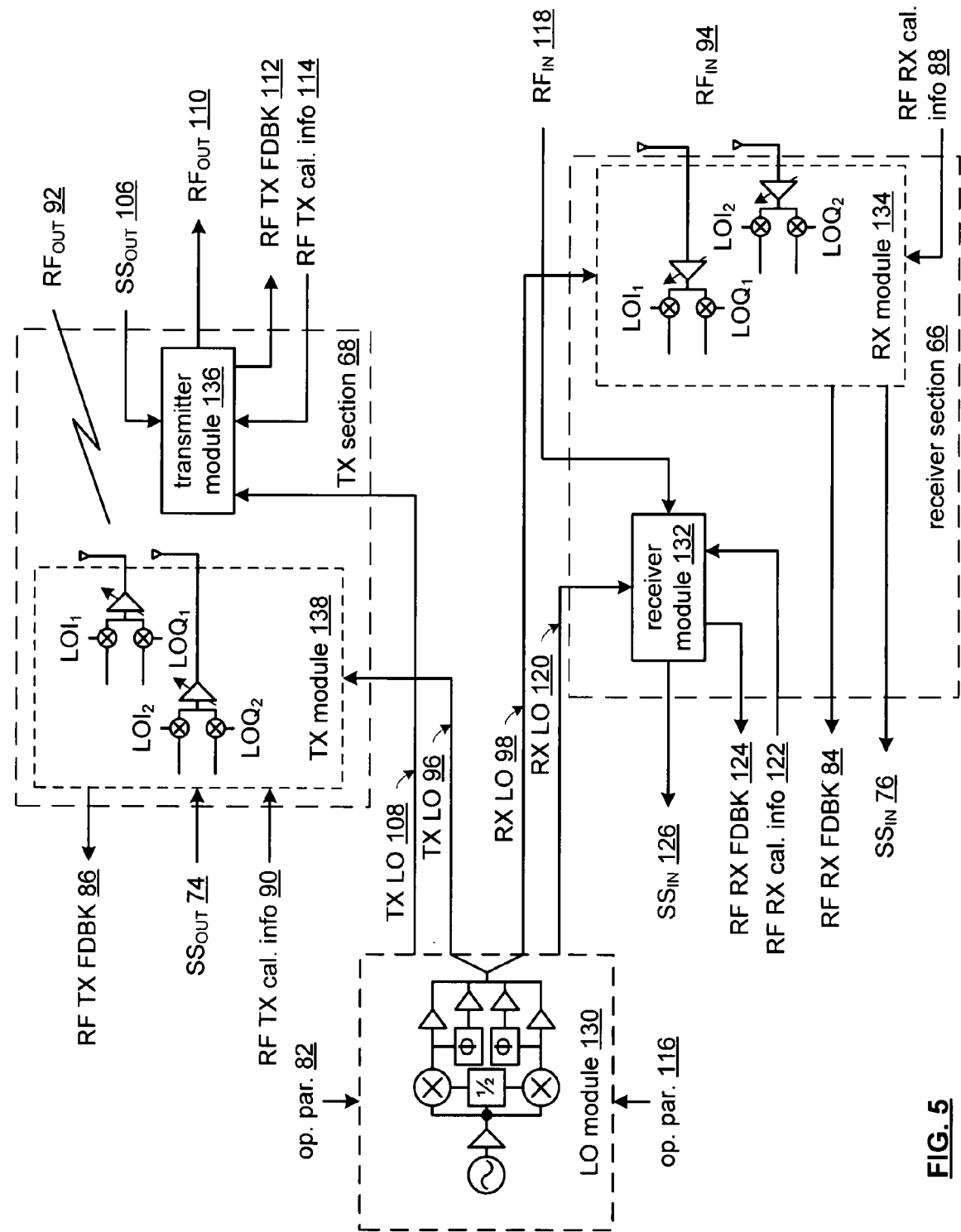
FIG. 5 is a schematic block diagram of an embodiment of a local oscillation module, a transmitter section, and a receiver section in accordance with the present invention.

FIG. 5 is a schematic block diagram of an embodiment of a local oscillation module 130, a transmitter section 68, and a receiver section 66 that may be used in the wireless communication device 50 of FIG. 4. In this embodiment, the transmitter section 68 includes a first transmitter module 136 and a second transmitter module 138 and the receiver section 66 includes a first receiver module 132 and a second receiver module 134. The local oscillation module 130 includes two or more local oscillators to produce the transmit and receive local oscillations 96, 98, 108, and 120. One of the local oscillations is shown to include a signal source (e.g., a crystal oscillator, phase locked loop, etc.), a ½ frequency divider, mixers, and a phase shift (e.g., $\phi$) to produce two pairs of local oscillations (e.g., $LOI_1$ and $LOQ_1$ and $LOI_2$ and $LOQ_2$).

Each of the transmitter modules 136 and 138 may be of a similar construct and each of the receiver modules 132 and 134 may also be of a similar construct. For example, the transmitter modules 136 and 138 may include two power amplifier modules (e.g., each including one or more power amplifiers and one or more amplifier drivers coupled in series and/or in parallel), a first pair of mixers, and a second pair of mixers. The first pair of mixers mix an analog and filtered representation of the outbound symbol stream 74 or 106 with a first local oscillation pair (e.g., $LOI_1$ and $LOQ_1$) to produce a mixed signal that is amplified by a first one of the power amplifier modules in accordance with the RF TX calibration information 90 or 114. The second pair of mixers mix the analog and filtered representation of the outbound symbol stream 74 or 106 with a second local oscillation pair (e.g., $LOI_2$ and $LOQ_2$) to produce a second mixed signal that is amplified by a second one of the power amplifier modules in accordance with the RF TX calibration information 90 or 114. The two RF signals are combined in air to produce the outbound RF signal 92 or 110. In this manner, by controlling the phase shift within the local oscillation module 130 beamforming, polarization diversity, maximum signal to interference ratio, and/or maximum signal to noise ratio may be obtained.

Continuing with the preceding example, the receiver modules 132 and 134 may each include low noise amplifier (LNA) modules (e.g., one or more low noise amplifiers coupled in series and/or in parallel), and two pairs of mixers. Each of the LNA modules receives the inbound RF signal 94 or 118 and amplifies it in accordance with the RF RX calibration information 88 or 122 to produce amplified inbound RF signals. The first pair of mixers mixes one of the amplified inbound RF signals with a first local oscillation pair (e.g., $LOI_1$ and $LOQ_1$) to produce a first analog representation of the inbound symbol stream. The second pair of mixers mixes the other amplifier inbound RF signal with a second local oscillation pair (e.g., $LOI_2$ and $LOQ_2$) to produce a second analog representation of the inbound symbol stream. The first and second analog representations of the inbound symbol stream are combined to produce an analog representation of the inbound symbol stream 76 or 126.

Figure 6:
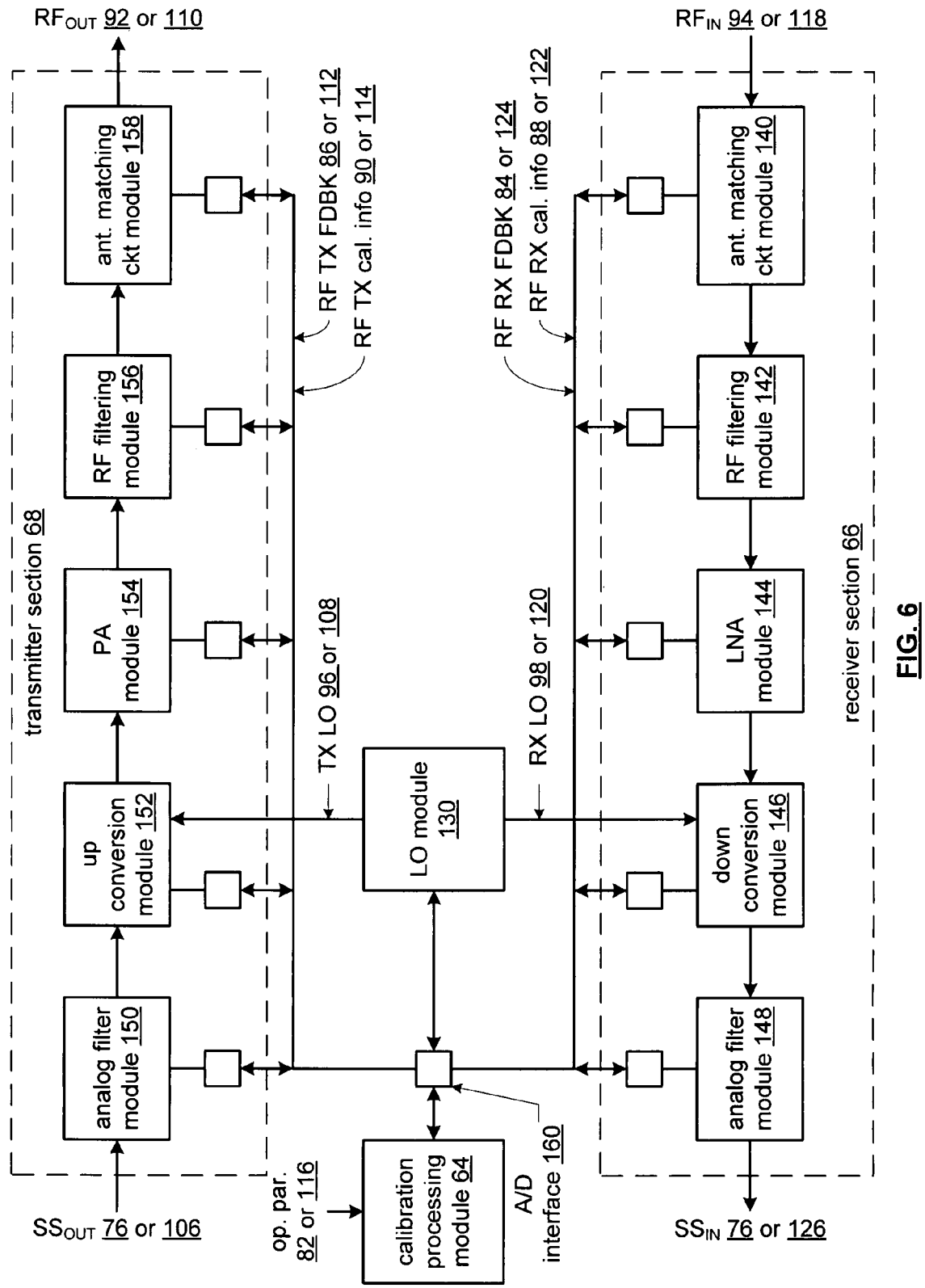
FIG. 6 is a schematic block diagram of another embodiment of a local oscillation module, a transmitter section, and a receiver section coupled to a calibration processing module in accordance with the present invention.

FIG. 6 is a schematic block diagram of another embodiment of a local oscillation module 130, a transmitter section 68, and a receiver section 66 coupled to a calibration processing module 64 via an analog to digital interface 160. In this embodiment, the receive section 66 includes an antenna matching circuit module 140, an RF filter module 142, an LNA module 144, a down conversion module 146, and an analog filter module 148. The transmitter section 68 includes an analog filter module 150, an up conversion module 152, a power amplifier (PA) module 154, an RF filtering module 156, and an antenna matching circuit module 158.

Within the receiver section 66, the antenna matching circuit module 140, which may include a transmission line, an impedance matching circuit, and/or tuning circuit, is coupled to receive the inbound RF signal 94 and/or 118 from the antenna system 54. The antenna matching circuit module 140 may be tuned in accordance with a matching control signal of the RF receiver calibration information 88 and/or 122. For example, the RF receiver calibration information 88 and/or 122 may provide control signals to set an impedance, bandwidth, center frequency, and/or quality factor of the antenna matching circuit module 140 to support the particular wireless communication protocol. In addition, the antenna matching circuit module 140 may generate receive antenna matching feedback of the RF receive feedback 84 and/or 124. For example, the receive antenna matching feedback may include measurements indicative of impedance, frequency response, bandwidth, quality factor, center frequency, etc. As an alternative example, the antenna matching circuit module 140 may include processing circuitry to interpret such measurements to calculate its input impedance, its frequency response, its bandwidth, its quality factor, its center frequency, etc. and to provide such values to the calibration module 64 via the analog to digital interface 160.

The RF filtering module 142 is coupled to filter the inbound RF signal in accordance with an RF filter control signal of the RF receiver calibration information 88 and/or 122 to produce a filtered inbound RF signal. For example, the RF filtering module 142 may adjust its gain/attenuation, its bandwidth, its roll-off, its corner frequency or frequencies, etc. in accordance with the RF filter control signal. In addition, the RF filtering module 142 may generate RF receive filtering feedback of the RF receive feedback 84 and/or 124. Such RF receive filtering feedback may include measurements indicative of gain/attenuation, bandwidth, roll-off, corner frequency or frequencies, etc. Alternatively, the RF filtering module 142 may include processing circuitry to interpret the measurements to calculate its gain/attenuation, its bandwidth, its roll-off, its corner frequency or frequencies, etc. and to provide such values to the calibration module 64 via the analog to digital interface 160.

The low noise amplifier (LNA) module 144 is coupled to amplify the filtered inbound RF signal in accordance with a LNA control signal of the RF receiver calibration information 88 and/or 122 to produce an amplified inbound RF signal. For example, the LNA module 144, which may include one or more low noise amplifiers coupled in series and/or in parallel, may adjust its gain, its input impedance, its frequency response, its bandwidth, its loading, etc. in accordance with the LNA control signal. In addition, the LNA module 144 may generate LNA feedback of the RF receive feedback 84 and/or 124. Such LNA feedback may include measurements indicative of gain, input impedance, frequency response, bandwidth, loading, etc. Alternatively, the LNA module 144 may include processing circuitry to interpret the measurements to calculate its gain, its input impedance, its frequency response, its bandwidth, its loading, etc. and to provide such values to the calibration module 64 via the analog to digital interface 160.

The down conversion module 146, which may include one or more pair of mixers and a combining circuit, is coupled to convert the amplified inbound RF signal into a baseband or near baseband signal (e.g., has a carrier frequency of 0 Hz to a few MHz) based on the receive local oscillation 98 and/or 120 and in accordance with a down conversion control signal of the RF receiver calibration information 88 and/or 122. For example, the down conversion module 146 may adjust its gain, its load, its frequency response, etc. in accordance with the down conversion control signal. In addition, the down conversion module 146 may generate down conversion feedback of the RF receive feedback 84 and/or 124. For example, the down conversion feedback may include measurements indicative of gain, load, frequency response, etc. Alternatively, the down conversion module 146 may include processing circuitry to interpret the measurements to calculate its gain, it load, it frequency response, etc. and to provide such values to the calibration module 64 via the analog to digital interface 160.

The analog baseband or near baseband filter module 148 is coupled to filter the baseband or near baseband signal in accordance with an analog filter control signal of the RF receiver calibration information 88 and/or 122 to produce an analog representation of the inbound symbol stream 76 and/or 126. For example, the analog baseband or near baseband filter module 148 may adjust its gain/attenuation, its bandwidth, its roll-off, its corner frequency or corner frequencies, etc. in accordance with the analog filter control signal. In addition, the analog baseband or near baseband filter module 148, which may include a gain stage, a low pass filter, and/or a bandpass filter, may generate analog filtering feedback of the RF receive feedback 84 and/or 124. For example, the analog filtering feedback may include measurements indicative of gain/attenuation, bandwidth, roll-off, corner frequency, corner frequencies, etc. Alternatively, the analog baseband or near baseband filter module 148 may include processing circuitry to interpret the measurements to calculate its gain/attenuation, its bandwidth, its roll-off, its corner frequency or corner frequencies, etc. and to provide such values to the calibration module 64 via the analog to digital interface 160.

In an embodiment, the network processing module 62 may establish the operational parameters to include a range of antenna matching parameters from which the matching control signal is generated; establish the operational parameters to include a range of RF filter control parameters from which the RF filter control signal is generated; establish the operational parameters to include a range of LNA parameters from which the LNA control signal is generated; establish the operational parameters to include a range of down-conversion parameters from which the down conversion control signal is generated; and/or establish the operational parameters to include a range of analog filter parameters from which the analog filter control signal is generated. As such, one or more of the components 140-148 of the receiver section 66 may be adjusted based on the RF receiver calibration information 88 or 122. Alternatively, the network processing module 62 may generate the operational parameters 82 and/or 116 such that one or more the components 140-148 of the receiver section 66 is set to a default, or nominal, operating level.

Within the transmitter section 68, the analog baseband or near baseband filter module 150 is coupled to filter the outbound symbol stream 76 and/or 106 in accordance with an analog filter control signal of the RF transmitter calibration information 90 and/or 114 to produce an analog representation of the outbound symbol stream. For example, the analog baseband or near baseband filter module 150, which may include a digital to analog converter, a gain stage, a low pass filter, and/or a bandpass filter, may adjust its gain/attenuation, its bandwidth, its roll-off, its corner frequency or corner frequencies, etc. in accordance with the analog filter control signal. In addition, the analog baseband or near baseband filter module 150 may generate analog filtering feedback of the RF transmit feedback 86 and/or 112. For example, the analog filtering feedback may include measurements indicative of gain/attenuation, bandwidth, roll-off, corner frequency, corner frequencies, etc. Alternatively, the analog baseband or near baseband filter module 150 may include processing circuitry to interpret the measurements to calculate its gain/attenuation, its bandwidth, its roll-off, its corner frequency or corner frequencies, etc. and to provide such values to the calibration module 64 via the analog to digital interface 160.

The up conversion module 152 is coupled to convert the analog representation of the outbound symbol stream into an up-converted signal based on the transmit local oscillation 96 and/or 108 and in accordance with an up conversion control signal of the RF transmitter calibration information 90 and/or 114. For example, the up conversion module 152, which may include one or more pair of mixers and a combining circuit, may adjust its gain, its load, its frequency response, etc. in accordance with the down conversion control signal. In addition, the up conversion module 152 may generate up conversion feedback of the RF transmit feedback 86 and/or 112. For example, the up conversion feedback may include measurements indicative of gain, load, frequency response, etc. Alternatively, the up conversion module 152 may include processing circuitry to interpret the measurements to calculate its gain, it load, it frequency response, etc. and to provide such values to the calibration module 64 via the analog to digital interface 160.

The power amplifier (PA) module 154 is coupled to amplify the up-converted signal in accordance with a PA control signal of the RF transmitter calibration information 90 and/or 114 to produce an amplified outbound RF signal. For example, the PA module 154, which may include one or more power amplifiers and/or one or more PA drivers coupled in series and/or in parallel, may adjust its gain, its input impedance, its frequency response, its bandwidth, its loading, etc. in accordance with the PA control signal. In addition, the PA module 154 may generate PA feedback of the RF transmit feedback 86 and/or 112. Such PA feedback may include measurements indicative of gain, input impedance, frequency response, bandwidth, loading, etc. Alternatively, the PA module 154 may include processing circuitry to interpret the measurements to calculate its gain, its input impedance, its frequency response, its bandwidth, its loading, etc. and to provide such values to the calibration module 64 via the analog to digital interface 160.

The RF filtering module 156 is coupled to filter the amplified outbound RF signal in accordance with an RF filter control signal of the RF transmitter calibration information to produce the outbound RF signal 92 and/or 110. For example, the RF filtering module 156 may adjust its gain/attenuation, its bandwidth, its roll-off, its corner frequency or frequencies, etc. in accordance with the RF filter control signal. In addition, the RF filtering module 156 may generate RF transmit filtering feedback of the RF transmit feedback 86 and/or 112. Such RF transmit filtering feedback may include measurements indicative of gain/attenuation, bandwidth, roll-off, corner frequency or frequencies, etc. Alternatively, the RF filtering module 156 may include processing circuitry to interpret the measurements to calculate its gain/attenuation, its bandwidth, its roll-off, its corner frequency or frequencies, etc. and to provide such values to the calibration module 64 via the analog to digital interface 160.

The antenna matching circuit module 158, which may include a transmission line, an impedance matching circuit, and/or tuning circuit, is coupled to provide the outbound RF signal 92 and/or 110 to the antenna system 54. The antenna matching circuit module 158 may be tuned in accordance with a matching control signal of the RF transmitter calibration information 86 and/or 112. For example, the RF transmitter calibration information 86 and/or 112 may provide control signals to set an impedance, bandwidth, center frequency, and/or quality factor of the antenna matching circuit module 158 to support the particular wireless communication protocol. In addition, the antenna matching circuit module 158 may generate receive antenna matching feedback of the RF transmit feedback 90 and/or 114. For example, the transmit antenna matching feedback may include measurements indicative of impedance, frequency response, bandwidth, quality factor, center frequency, etc. As an alternative example, the antenna matching circuit module 158 may include processing circuitry to interpret such measurements to calculate its input impedance, its frequency response, its bandwidth, its quality factor, its center frequency, etc. and to provide such values to the calibration module 64 via the analog to digital interface 160.

In an embodiment, the network processing module 62 may establish the operational parameters to include a range of analog filter parameters from which the analog filter control signal is generated; establish the operational parameters to include a range of up-conversion parameters from which the up conversion control signal is generated; establish the operational parameters to include a range of PA parameters from which the PA control signal is generated; establish the operational parameters to include a range of RF filter control parameters from which the RF filter control signal is generated; and establish the operational parameters to include a range of antenna matching parameters from which the matching control signal is generated. As such, one or more of the components 150-158 of the transmitter section 68 may be adjusted based on the RF transmitter calibration information 90 or 114. Alternatively, the network processing module 62 may generate the operational parameters 82 and/or 116 such that one or more the components 150-158 of the transmitter section 68 is set to a default, or nominal, operating level.

Figure 7:
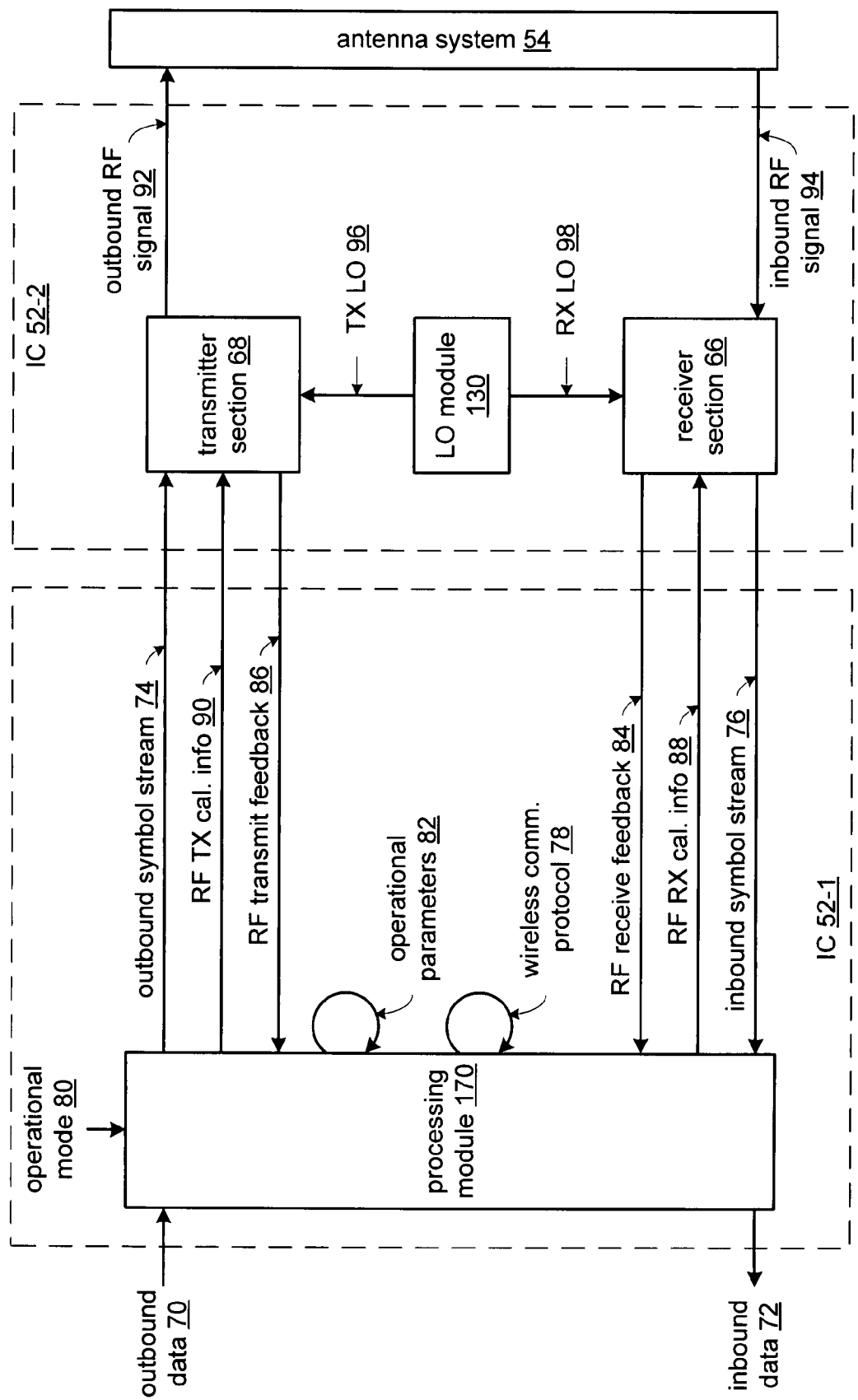
FIG. 7 is a schematic block diagram of another embodiment of a wireless communication device in accordance with the present invention.

FIG. 7 is a schematic block diagram of another embodiment of a wireless communication device 50 that includes two ICs 52-1 and 52-1 and the antenna system 54. In this embodiment, IC 52-1 includes a processing module 170 and IC 52-2 includes a receiver section 66, a transmitter section 68, and a local oscillation module 130. The processing module 170 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 7-19.

In operation, the processing module 170 establishes a wireless communication protocol 78 in accordance with an operational mode 80 of the wireless communication device. The wireless communication protocol 78 may be one or more of a WLAN communication protocol (e.g., IEEE 802.11x, FFC), a WPAN communication protocol (e.g., Bluetooth, ZigBee, IEEE 802.15x, NFC) and a WWAN communication protocol (e.g., GSM, EDGE, GPRS, WCDMA, CDMA, HSDPA, HSUPA, DVB-H, DMB, GPS, FM). Note that the processing module 170 may automatically detect the operational mode 80 and/or detect the operational mode 80 based on a user selection.

The processing module 170 also establishes operational parameters 82 based on the wireless communication protocol 78. The operational parameters 82 may includes limits and/or specific values for one or more of frequency bands, channels, gain settings, filter corner frequency or frequencies, filter attenuation roll-off, bandwidth, center frequency, quality factor, frequency dependent impedance value, attenuation setting, gain roll-off, transmit power settings, antenna configuration settings, and frequency response.

The processing module 170 receives feedback from the receiver section 66 and the transmitter section 68 (e.g., RF receive feedback 84 and RF transmit feedback 86, respectively). The processing module 170 uses the operational parameters 82 and the RF receive feedback 84 to generate RF receiver calibration information 88. In an embodiment, the processing module 170 utilizes the operational parameters 82 to determine desired performance levels of the receiver section 66 and uses the RF receive feedback 84 to determine actual performance levels. The processing module 170 determines differences between the desired performance levels and the actual performance levels to generate the RF receiver calibration information 88. The RF receiver calibration information 88 may include one or more of: default settings for one or more components of the receiver section 66, new or adjusted LNA settings, new or adjusted antenna matching settings, new or adjusted antenna configuration settings, new or adjusted RF filtering settings, new or adjusted analog filtering settings, and new or adjusted down conversion mixer settings.

The processing module 170 also uses the operational parameters 82 and the RF transmit feedback 86 to generate RF transmitter calibration information 90. In an embodiment, the processing module 170 utilizes the operational parameters 82 to determine desired performance levels of the transmitter section 6 and uses the RF transmit feedback 86 to determine actual performance levels. The processing module 170 determines differences between the desired performance levels and the actual performance levels to generate the RF transmitter calibration information 90. The RF transmitter calibration information 90 may include one or more of: default settings for one or more components of the transmitter section 68, new or adjusted PA settings, new or adjusted antenna matching settings, new or adjusted antenna configuration settings, new or adjusted RF filtering settings, new or adjusted analog filtering settings, and new or adjusted up-conversion mixer settings.

The processing module 170 further functions to convert outbound data 70 (e.g., digitized voice, data, text, image file, audio file, video file, etc.) into an outbound symbol stream 74 in accordance with the wireless communication protocol 78. The particular type of processing performed by the processing module 170 is dependent upon the wireless communication protocol 78 and may include, but is not limited to, scrambling, encoding, puncturing, constellation mapping, PSK modulation, GMSK modulation, QPSK modulation, FSK modulation, 8-PSK modulation, n-QAM modulation, and/or digital baseband to IF conversion.

The processing module 170 also converts an inbound symbol stream 76 into inbound data 72 (e.g., digitized voice, data, text, image file, audio file, video file, GPS signals, digitized FM audio, digital video broadcast, etc.) in accordance with the wireless communication protocol 78. The particular type of processing performed by the processing module 170 is dependent upon the wireless communication protocol 78 and may include, but is not limited to, descrambling, decoding, depuncturing, constellation demapping, PSK demodulation, GMSK demodulation, QPSK demodulation, FSK demodulation, 8-PSK demodulation, n-QAM demodulation, and/or IF to digital baseband conversion.

The receiver section 66 provides the RF receive feedback 84 and converts an inbound RF signal 94 into the inbound symbol stream 76 in accordance with the RF receiver calibration information 88 and a receive local oscillation 98. The conversion performed by the receiver section 66 is dependent upon the wireless communication protocol. For example, if the wireless communication protocol utilizes Gaussian Minimum Shift Keying (GMSK) scheme, the receiver section 66 includes a GMSK receiver architecture to recover a GMSK modulated signal (e.g., the inbound symbol stream 76) from the inbound RF signal 94. As another example, if the wireless communication protocol utilizes an 8-PSK (phase shift keying) scheme and/or an x-QAM scheme, the receiver section 66 includes an 8-PSK or x-QAM receiver architecture to recover an 8-PSK or x-QAM modulated signal (e.g., the inbound symbol stream 76) from the inbound RF signal 94.

The transmitter section 68 provides the RF transmit feedback 86 and converts the outbound symbol stream 74 into an outbound RF signal 92 in accordance with the RF transmitter calibration information 90 and a transmit local oscillation 96. The conversion performed by the transmitter section 68 is dependent upon the wireless communication protocol. For example, if the wireless communication protocol utilizes a GMSK scheme, the transmitter section 68 includes a GMSK transmitter architecture to convert a GMSK modulated signal (e.g., the outbound symbol stream 76) into the outbound RF signal 92. As another example, if the wireless communication protocol utilizes an 8-PSK (phase shift keying) scheme and/or an x-QAM scheme, the transmitter section 68 includes an 8-PSK or x-QAM transmitter architecture to convert an 8-PSK or x-QAM modulated signal (e.g., the outbound symbol stream 76) into the outbound RF signal 92.

The antenna system 54 (embodiments of which are described in greater detail with reference to FIGS. 8-19) provides the inbound RF signal 94 to the receiver section 66 and receives the outbound RF signal 92 from the transmitter section 68. The antenna section 54 then transmits the outbound RF signal 92.

Figure 8:
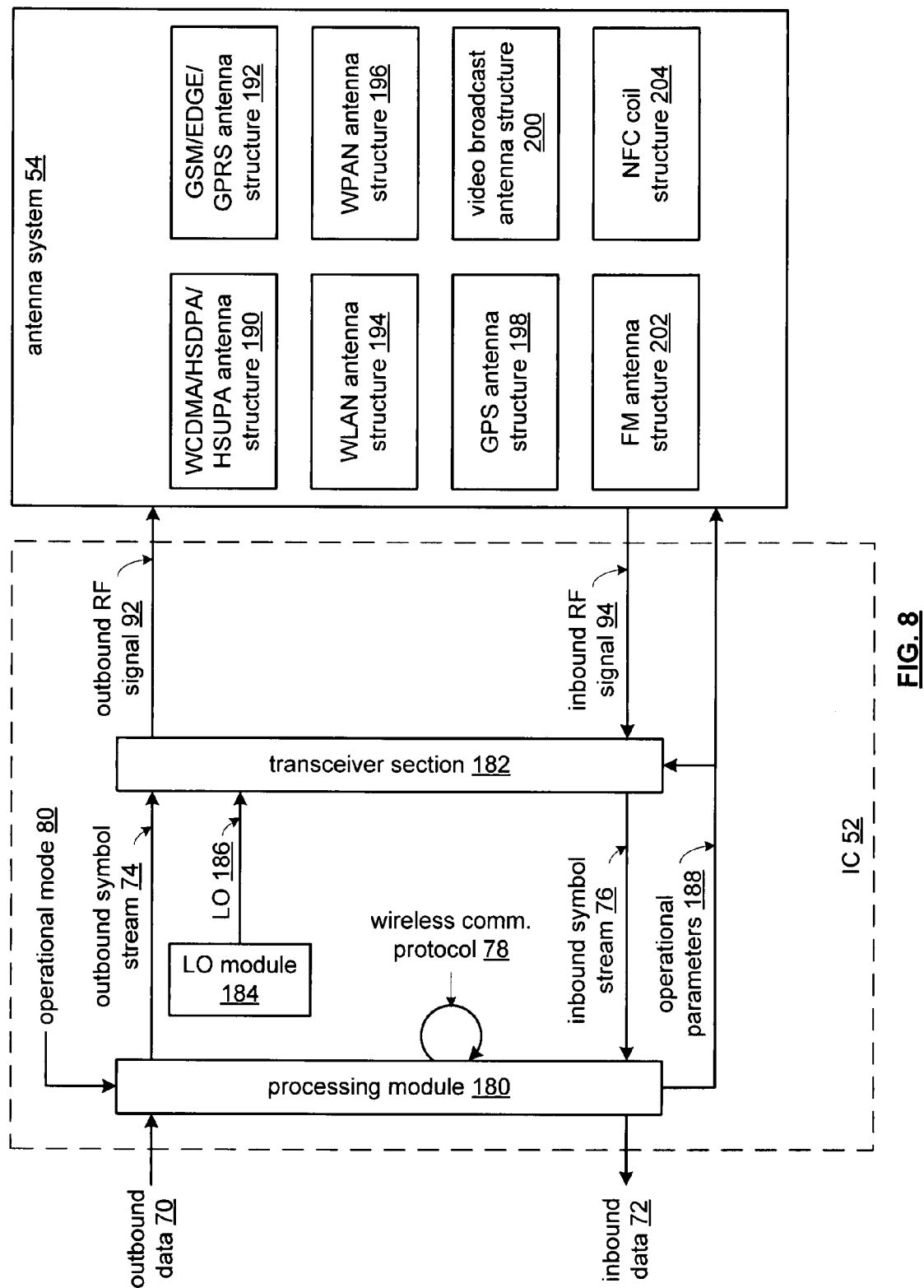
FIG. 8 is a schematic block diagram of another embodiment of a wireless communication device in accordance with the present invention.

FIG. 8 is a schematic block diagram of another embodiment of a wireless communication device 50 that includes an IC 52 and the antenna system 54. In this embodiment, IC 52 includes a processing module 180, a transceiver section 182, and a local oscillation module 184. The processing module 180 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 8-19.

In operation, the processing module 180 establishes a wireless communication protocol 78 in accordance with an operational mode 80 of the wireless communication device. The wireless communication protocol 78 may be one or more of a WLAN communication protocol (e.g., IEEE 802.11x, FFC), a WPAN communication protocol (e.g., Bluetooth, ZigBee, IEEE 802.15x, NFC) and a WWAN communication protocol (e.g., GSM, EDGE, GPRS, WCDMA, CDMA, HSDPA, HSUPA, DVB-H, DMB, GPS, FM). Note that the processing module 180 may automatically detect the operational mode 80 and/or detect the operational mode 80 based on a user selection.

The processing module 180 also establishes operational parameters 188 based on the wireless communication protocol 78. The operational parameters 188 may includes limits and/or specific values for one or more of frequency bands, channels, gain settings, filter corner frequency or frequencies, filter attenuation roll-off, bandwidth, center frequency, quality factor, frequency dependent impedance value, attenuation setting, gain roll-off, transmit power settings, antenna configuration settings, and frequency response.

The processing module 180 further functions to convert outbound data 70 (e.g., digitized voice, data, text, image file, audio file, video file, etc.) into an outbound symbol stream 74 in accordance with the wireless communication protocol 78. The particular type of processing performed by the processing module 180 is dependent upon the wireless communication protocol 78 and may include, but is not limited to, scrambling, encoding, puncturing, constellation mapping, PSK modulation, GMSK modulation, QPSK modulation, FSK modulation, 8-PSK modulation, n-QAM modulation, and/or digital baseband to IF conversion.

The processing module 180 also converts an inbound symbol stream 76 into inbound data 72 (e.g., digitized voice, data, text, image file, audio file, video file, GPS signals, digitized FM audio, digital video broadcast, etc.) in accordance with the wireless communication protocol 78. The particular type of processing performed by the processing module 180 is dependent upon the wireless communication protocol 78 and may include, but is not limited to, descrambling, decoding, depuncturing, constellation demapping, PSK demodulation, GMSK demodulation, QPSK demodulation, FSK demodulation, 8-PSK demodulation, n-QAM demodulation, and/or IF to digital baseband conversion.

The transceiver section 182, which may include the receiver section 66 and the transmitter section 68, converts an inbound RF signal 94 into the inbound symbol stream 76 in accordance with a local oscillation 186 and the operational parameters 188. The conversion performed by the transceiver section 182 is dependent upon the wireless communication protocol. For example, if the wireless communication protocol utilizes Gaussian Minimum Shift Keying (GMSK) scheme, the transceiver section 182 includes a GMSK receiver architecture to recover a GMSK modulated signal (e.g., the inbound symbol stream 76) from the inbound RF signal 94. As another example, if the wireless communication protocol utilizes an 8-PSK (phase shift keying) scheme and/or an x-QAM scheme, the transceiver section 182 includes an 8-PSK or x-QAM receiver architecture to recover an 8-PSK or x-QAM modulated signal (e.g., the inbound symbol stream 76) from the inbound RF signal 94.

The transceiver section 182 also converts the outbound symbol stream 74 into an outbound RF signal 92 in accordance with the local oscillation 186 and the operational parameters. The conversion performed by the transceiver section 182 is dependent upon the wireless communication protocol. For example, if the wireless communication protocol utilizes a GMSK scheme, the transceiver section 182 includes a GMSK transmitter architecture to convert a GMSK modulated signal (e.g., the outbound symbol stream 76) into the outbound RF signal 92. As another example, if the wireless communication protocol utilizes an 8-PSK (phase shift keying) scheme and/or an x-QAM scheme, the transceiver section 182 includes an 8-PSK or x-QAM transmitter architecture to convert an 8-PSK or x-QAM modulated signal (e.g., the outbound symbol stream 76) into the outbound RF signal 92.

The local oscillation module 184, which may include one or more local oscillators as illustrated in FIG. 5, generates the local oscillation 186 in accordance with the wireless communication protocol 78. For example, the local oscillation 186 may include a receive local oscillation 98 and/or 120 and a transmit local oscillation 96 and/or 108.

The antenna system 54 provides the inbound RF signal 94 to the receiver section 66 and receives the outbound RF signal 92 from the transmitter section 68 in accordance with the operational parameters 188. The antenna section 54 then transmits the outbound RF signal 92. The antenna system 54 may be configured to provide one of the plurality of antenna structures 190-204 in accordance with the operational parameters 188 to transceive the inbound and outbound RF signals 92 and/or 94. The plurality of antenna structures includes two or more of a WCDMA antenna structure 190; an HSDPA antenna structure 190; an HSUPA antenna structure 190; a GSM antenna structure 192; an EDGE antenna structure 192; a GPRS antenna structure 192; a WLAN antenna structure 194; a WPAN antenna structure 196; a GPS antenna structure 198; a DVB-H antenna structure 200; a DMB antenna structure 200; an FM antenna structure 202, an NFC coil structure 204; and an RFID antenna structure 204. Note that an antenna structure 190-204 may include one or more antennas of the same polarization, of different polarizations, arranged in a diversity pattern, arranged in an array, having programmable segments, having programmable compensation components, and/or a combination thereof. Further note that the RFID antenna structure may be a NFC coil structure 204 for NFC RFID communications and/or a WLAN antenna structure for FFC RFID communications.

With respect to the antenna system 54, the operational parameters 188 include two or more of: a frequency band in accordance with the wireless communication protocol; a channel within the frequency band, channel bandwidth of the channel, interferer frequency, antenna radiation pattern, full duplex communication, half duplex communication, gain setting, impedance setting, center frequency setting, attenuation setting, attenuation roll-off, antenna quality factor, antenna polarization setting, and antenna diversity setting. Based on two or more of these operational parameters 188, the antenna system 54 provides one or more of the above mentioned antenna structures 190-204.

Figure 9:
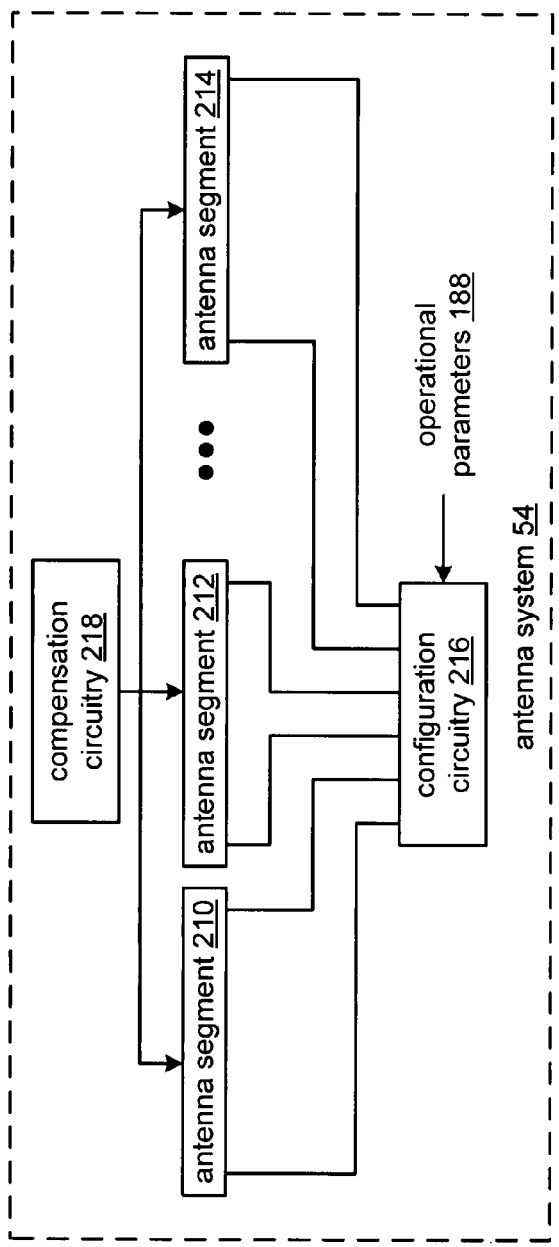
FIG. 9 is a schematic block diagram of an embodiment of an antenna system in accordance with the present invention.

FIG. 9 is a schematic block diagram of an embodiment of an antenna system 54 that includes a plurality of antenna segments 210-214, configuration circuitry 216, and compensation circuitry 218. The configuration circuitry 216 couples the plurality of antenna segments 210-214 into a first antenna structure for transceiving radio frequency signals within a first radio frequency band when indicated by the operational parameters 188 and couples the plurality of antenna segments 210-214 into a second antenna structure for transceiving radio frequency signals within a second radio frequency band when indicted by the operational parameters 188. In a further embodiment, the configuration circuitry 216 couples the plurality of antenna segments 210-214 into a third antenna structure for transceiving radio signals within a third radio frequency band when indicated by the operational parameters 188.

In an embodiment, each of the antenna segments 210-214 includes a monopole antenna, which may be implemented as a meandering trace on a PCB, a dipole antenna, which may be implemented as a meandering trace on a PCB, a Yagi antenna, and/or a helical antenna as taught in co-pending patent application entitled PLANER HELICAL ANTENNA, having a filing date of Mar. 21, 2006 and a Ser. No. 11/386,247. In such an embodiment, the configuration circuitry 216 may include a transistor to provide coupling between first and second antenna segments of the plurality of antenna segments 210-214 and/or a capacitor to provide coupling between the first and second antenna segments of the plurality of antenna segments 210-214.

In addition, the compensation circuitry 218 is coupled to the antenna segments 210-214 adjust a characteristic of the antenna structure in accordance with at least one of: the antenna radiation pattern, the gain setting, the impedance setting, the attenuation setting, the attenuation roll-off, the antenna quality factor, the antenna polarization setting, and the antenna diversity setting of the operational parameters 188. An embodiment of the compensation circuitry 218 is discussed with reference to FIG. 12.

Figure 10:
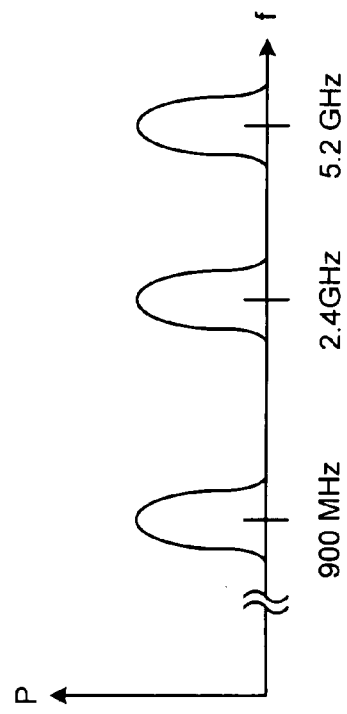
FIG. 10 is a diagram of example frequency bands of an antenna system in accordance with the present invention.

FIG. 10 is a frequency domain diagram of three frequency bands centered at 900 MHz, 2.4 GHz, and 5.2 GHz. If a multiple band antenna system 54 were to be made to support these three bands, the antenna segments 210-214 would need to provide the desired antenna length for the corresponding frequency bands.

Figure 11:
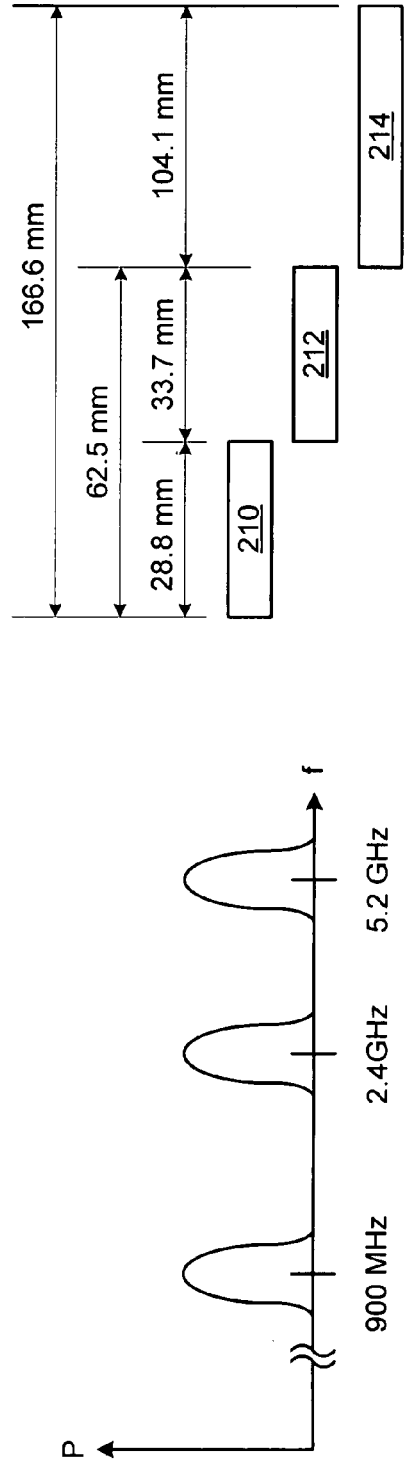
FIG. 11 is a diagram of an embodiment of an antenna system in accordance with the present invention.

FIG. 11 is a diagram of an embodiment of the antenna segments 210-214 to provide an antenna structure that supports the frequency bands of FIG. 10. In this example, the first antenna segment 210 is sized to provide a ½ wavelength ($\lambda$) dipole antenna for the 5.2 GHz operation. As is known, a 5.2 GHz signal has a wavelength of $3*10^8/5.2*10^9 = 57.7$ mm and, accordingly, a ½ wavelength dipole antenna has a length of 28.8 mm. The antenna segment 210 may be of a meander trace shape, a planer helical winding, etc. As such, when the RF transceiver is in a 5.2 GHz mode, the configuration circuitry 216 couples the first antenna segment 210 to provide the 5.2 GHz antenna structure.

For 2.4 GHz operation, the resulting ½λ dipole antenna structure has a total length of 62.5 mm ($\lambda_{2.4G}=3*10^8/2.4*10^9=125$ mm). Since the first antenna segment 210 is 28.8 mm in length, the second antenna segment 212 should be 33.7 mm in length to provide the desired overall length of 62.5 mm. The antenna segment 212 may also be of a meander trace shape, a planer helical winding, etc. In this mode, the configuration circuitry 216 couples the first and second antenna segments 210 and 212 together to provide a 2.4 GHz dipole antenna.

For 900 MHz operation, the resulting ½λ dipole antenna structure has a total length of 166.6 mm ($\lambda_{900M}=3*10^8/9*10^8=333$ mm). Since the first antenna segment 210 is 28.8 mm in length and the second antenna segment 212 is 33.7 mm in length, the third antenna segment 214 should be 104.1 mm in length to provide the desired overall length of 166.6 mm. The antenna segment 214 may also be of a meander trace shape, a planer helical winding, etc. In this mode, the configuration circuitry 216 couples the first, second, and third antenna segments 210-214 together to provide a 900 MHz dipole antenna. As an alternative example, the number of antenna segments and their corresponding lengths may vary depending on the desired number of antenna structures to support a variety of frequency bands.

Figure 12:
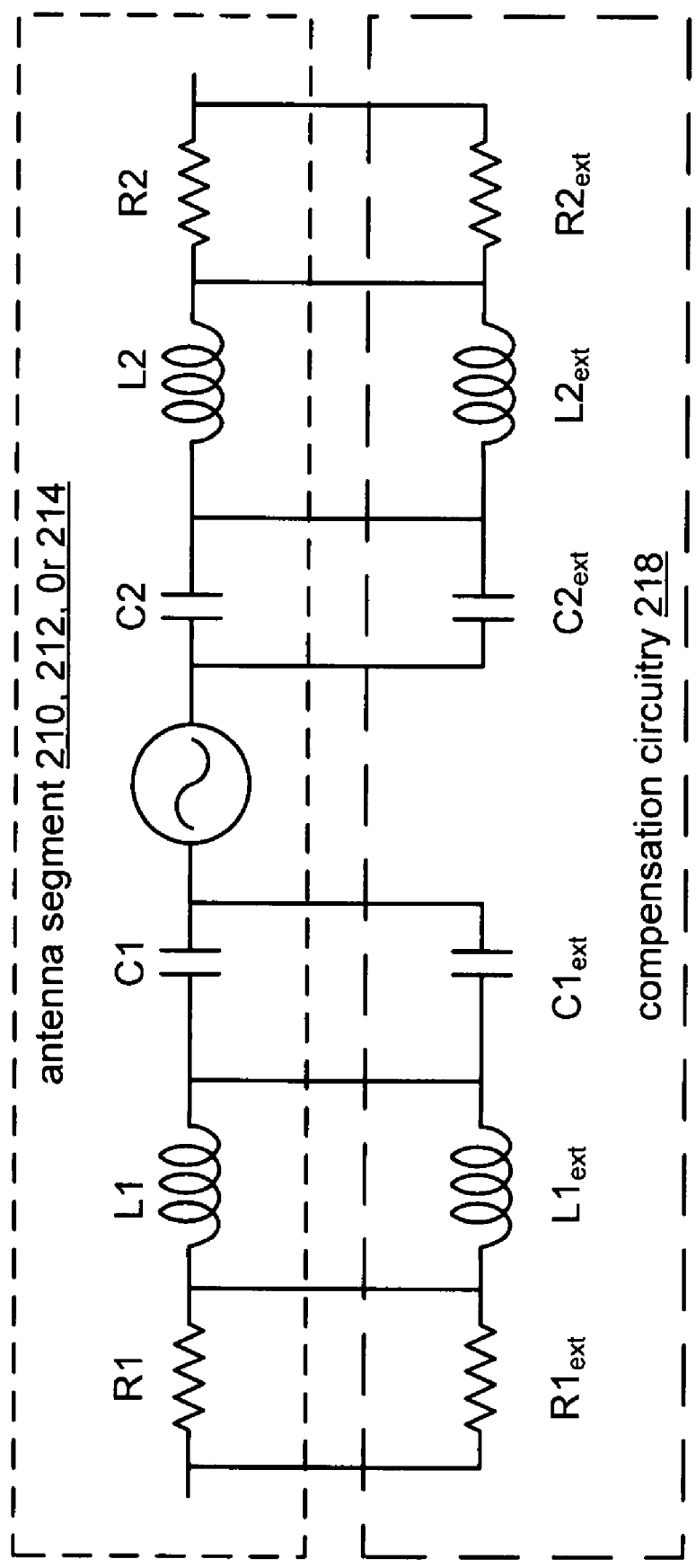
FIG. 12 is a schematic block diagram of another embodiment of an antenna system in accordance with the present invention.

FIG. 12 is a schematic block diagram of another embodiment of an antenna system 54 that includes one or more of the antenna segments 210-214 and a corresponding portion of the compensation circuitry 218. In this embodiment, the antenna segment 210, 212, and/or 214 includes a resistive component (R1 and R2), an inductive component (L1 and L2), a capacitive component (C1 and C2). The corresponding portion of the compensation circuitry 218 includes an externally coupled resistive component ($R1_{ext}$ and $R2_{ext}$), an inductive component ($L1_{ext}$ and $L2_{ext}$), and/or an capacitive component ($C1_{ext}$ and $C2_{ext}$). The resistor, inductor, and/or capacitor of the compensation circuitry 218 may be fixed and/or adjustable. In this instance, the compensation circuitry 218 is programmed in accordance with the operational parameters 188 to adjust one or more of the antenna structure's quality factor, the antenna structure's bandwidth, the antenna structure's center frequency, the antenna structure's gain/attenuation, and/or the antenna structure's impedance.

Figure 13:
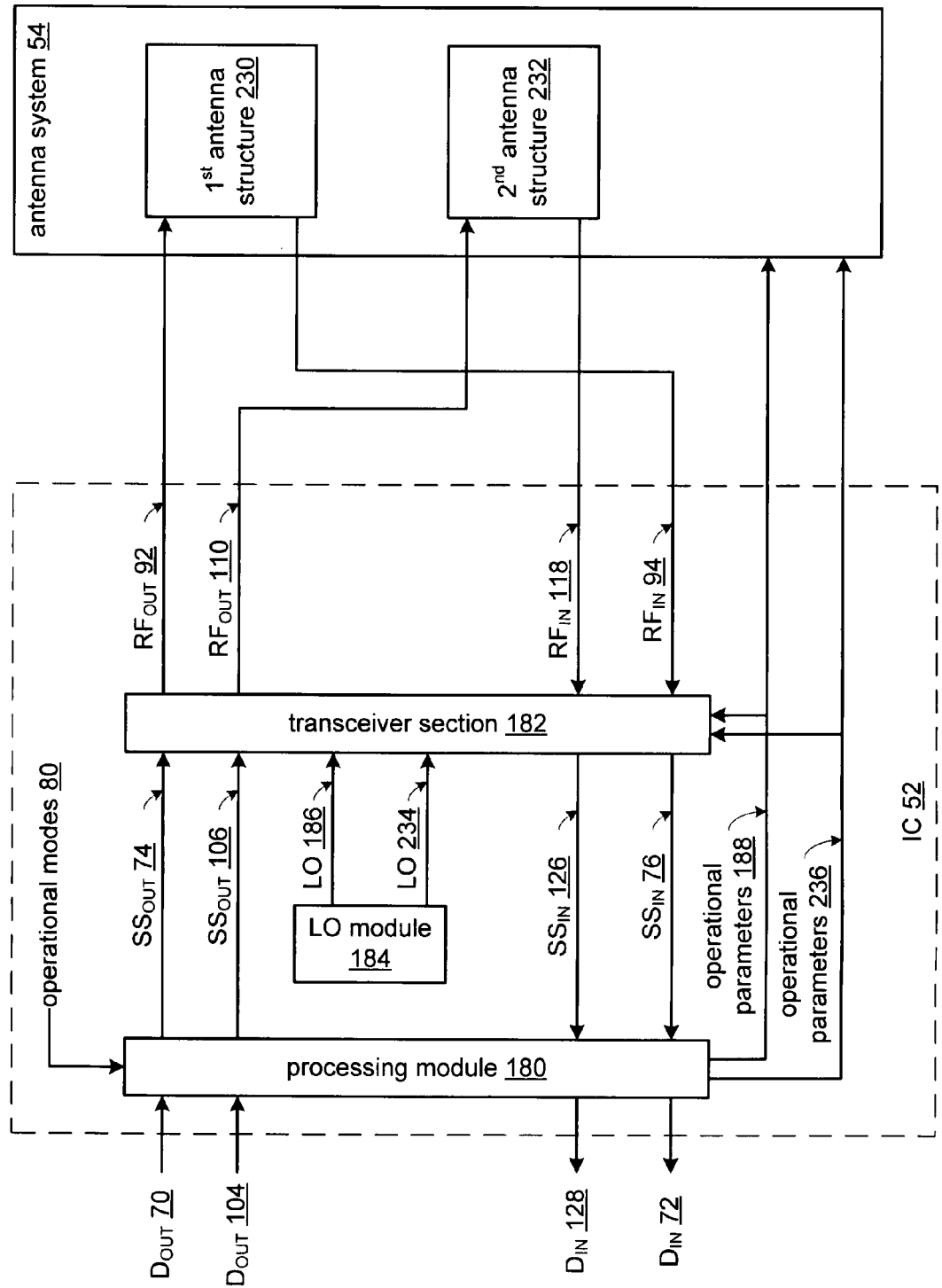
FIG. 13 is a schematic block diagram of another embodiment of a wireless communication device in accordance with the present invention.

FIG. 13 is a schematic block diagram of another embodiment of a wireless communication device 50 that includes an IC 52 and the antenna system 54. In this embodiment, IC 52 includes a processing module 180, a transceiver section 182, and a local oscillation module 184. The antenna system 54 includes a first antenna structure 230 and a second antenna structure 232.

The processing module 180 is coupled to establish a first wireless communication protocol and a second wireless communication protocol in accordance with two of the plurality of operational modes 80 of the wireless communication device 50. The first and second wireless communication protocols may each be one or more of a WLAN communication protocol (e.g., IEEE 802.11x, FFC), a WPAN communication protocol (e.g., Bluetooth, ZigBee, IEEE 802.15x, NFC) and a WWAN communication protocol (e.g., GSM, EDGE, GPRS, WCDMA, CDMA, HSDPA, HSUPA, DVB-H, DMB, GPS, FM). Note that the processing module 170 may automatically detect the operational mode 80 and/or detect the operational mode 80 based on a user selection.

The processing module 180 further functions to establish first operational parameters 188 based on the first wireless communication protocol and to establish second operational parameters 236 based on the second wireless communication protocol. Each of the operational parameters 188 and 236 may include limits and/or specific values for one or more of frequency bands, channels, gain settings, filter corner frequency or frequencies, filter attenuation roll-off, bandwidth, center frequency, quality factor, frequency dependent impedance value, attenuation setting, gain roll-off, transmit power settings, antenna configuration settings, and frequency response.

The processing module 180 further functions to convert outbound data 70 (e.g., digitized voice, data, text, image file, audio file, video file, etc.) into an outbound symbol stream 74 in accordance with the first wireless communication protocol. The processing module 180 also converts outbound data 104 (e.g., digitized voice, data, text, image file, audio file, video file, etc.) into an outbound symbol stream 106 in accordance with the second wireless communication protocol. The particular type of processing performed by the processing module 180 is dependent upon the wireless communication protocol and may include, but is not limited to, scrambling, encoding, puncturing, constellation mapping, PSK modulation, GMSK modulation, QPSK modulation, FSK modulation, 8-PSK modulation, n-QAM modulation, and/or digital baseband to IF conversion.

The processing module 180 also converts an inbound symbol stream 76 into inbound data 72 (e.g., digitized voice, data, text, image file, audio file, video file, GPS signals, digitized FM audio, digital video broadcast, etc.) in accordance with the first wireless communication protocol. The processing module 180 also converts an inbound symbol stream 126 into inbound data 128 (e.g., digitized voice, data, text, image file, audio file, video file, GPS signals, digitized FM audio, digital video broadcast, etc.) in accordance with the second wireless communication protocol. The particular type of processing performed by the processing module 180 is dependent upon the wireless communication protocol and may include, but is not limited to, descrambling, decoding, depuncturing, constellation demapping, PSK demodulation, GMSK demodulation, QPSK demodulation, FSK demodulation, 8-PSK demodulation, n-QAM demodulation, and/or IF to digital baseband conversion.

The transceiver section 182, which may include the receiver section 66 and the transmitter section 68, converts an inbound RF signal 94 into the inbound symbol stream 76 in accordance with a local oscillation 186 and the operational parameters 188 and converts an inbound RF signal 118 into the inbound symbol stream 126 in accordance with a local oscillation 234 and the operational parameters 236. The conversion performed by the transceiver section 182 is dependent upon the wireless communication protocol. For example, if the wireless communication protocol utilizes Gaussian Minimum Shift Keying (GMSK) scheme, the transceiver section 182 includes a GMSK receiver architecture to recover a GMSK modulated signal (e.g., the inbound symbol stream 76) from the inbound RF signal 94. As another example, if the wireless communication protocol utilizes an 8-PSK (phase shift keying) scheme and/or an x-QAM scheme, the transceiver section 182 includes an 8-PSK or x-QAM receiver architecture to recover an 8-PSK or x-QAM modulated signal (e.g., the inbound symbol stream 76) from the inbound RF signal 94.

The transceiver section 182 also converts the outbound symbol stream 74 into an outbound RF signal 92 in accordance with the local oscillation 186 and the operational parameters 188 and converts the outbound symbol stream 106 into an outbound RF signal 110 in accordance with the local oscillation 234 and the operational parameters 236. The conversion performed by the transceiver section 182 is dependent upon the wireless communication protocol. For example, if the wireless communication protocol utilizes a GMSK scheme, the transceiver section 182 includes a GMSK transmitter architecture to convert a GMSK modulated signal (e.g., the outbound symbol stream 76) into the outbound RF signal 92. As another example, if the wireless communication protocol utilizes an 8-PSK (phase shift keying) scheme and/or an x-QAM scheme, the transceiver section 182 includes an 8-PSK or x-QAM transmitter architecture to convert an 8-PSK or x-QAM modulated signal (e.g., the outbound symbol stream 76) into the outbound RF signal 92.

The local oscillation module 184, which may include one or more local oscillators as illustrated in FIG. 5, generates the local oscillations 186 and 234 in accordance with the wireless communication protocols. In an embodiment, the local oscillation 186 may include receive local oscillations 98 and 120 and transmit local oscillations 96 and 108.

The antenna system 54 includes a first antenna structure 230 enabled in accordance with the first operational parameters 188 to transceive the first inbound and outbound RF signals 92 and 94 and a second antenna structure 232 enabled in accordance with the second operational parameters 236 to transceive the second inbound and outbound RF signals 110 and 118.

In another embodiment, the processing module 180 is coupled to determine whether the wireless communication device 50 is in at least one of: a wireless wide area network (WWAN) mode and a wireless local area network (WLAN) mode. Such a determination may be made based on signals being transceived and/or based on a user input to select the mode.

When the wireless communication device 50 is in the WWAN mode, the processing module 180 converts outbound data 70 into a first outbound symbol stream 74 in accordance with a WWAN protocol and converts a first inbound symbol stream 94 into inbound data 76 in accordance with the WWAN protocol. When the wireless communication device is in the WLAN mode, the processing module 180 converts the outbound data 70 into a second outbound symbol stream 110 in accordance with a WLAN protocol and converts a second inbound symbol stream 126 into the inbound data 72 in accordance with the WLAN protocol.

In this embodiment, the transceiver section 182 is coupled to convert a first inbound RF signal 94 into the first inbound symbol stream 76 in accordance with a first local oscillation 186 and convert the first outbound symbol stream 74 into a first outbound RF signal 92 in accordance with the first local oscillation 186 when the wireless communication device is in the WWAN mode. When the wireless communication device 50 is in the WLAN mode, the transceiver section 182 converts a second inbound RF signal 118 into the second inbound symbol stream 126 in accordance with a second local oscillation 234 and converts the second outbound symbol stream 106 into a second outbound RF signal 110 in accordance with the second local oscillation 234.

Also in this embodiment, the antenna system 54 includes a WWAN antenna structure 230 (e.g., GSM, EDGE, GPRS, WCDMA, CDMA, HSDPA, HSUPA, DVB-H, DMB, GPS, and/or FM antenna structure) and a WLAN antenna structure 194 or 232 (e.g., IEEE 802.11x antenna structure, FFC antenna structure). When the wireless communication device 50 is in the WWAN mode, the WWAN antenna structure 230 is enabled to transceive the first inbound and outbound RF signals 92 and 94. When the wireless communication device 50 is in the WLAN mode, the WLAN antenna structure 232 is enabled to transceive the second inbound and outbound RF signals 110 and 118. Note that an antenna element of at least one of the WWAN antenna structure and the WLAN antenna structure may be located on a package substrate of the integrated circuit 52.

In another embodiment, the processing module 180 determines that the wireless communication device 50 is in a wireless personal area network (WPAN) mode. When the wireless communication device 50 is in the WPAN mode, the processing module 180 functions to convert the outbound data into a third outbound symbol stream in accordance with a WPAN protocol and to convert a third inbound symbol stream into the inbound data in accordance with the WPAN protocol. Note that the WPAN communication protocol may be in accordance with Bluetooth, ZigBee, IEEE 802.15x, and/or NFC protocols.

In this embodiment, the RF transceiver section 182 convert a third inbound RF signal into the third inbound symbol stream in accordance with a third local oscillation and convert the third outbound symbol stream into a third outbound RF signal in accordance with the third local oscillation. The antenna system 54 further includes a WPAN antenna structure 196 that is enabled to transceive the third inbound and outbound RF signals when the wireless communication device 50 is in the WPAN mode.

In another embodiment, the processing module 180 determines that the wireless communication device 50 is in a global position system (GPS) mode. In this mode, the processing module converts a plurality of inbound GPS signals into the inbound data in accordance with the GPS protocol. The RF transceiver section 182 converts a plurality of inbound GPS RF signals into the plurality of inbound GPS signals.

In this mode, the antenna system 54 includes a GPS antenna structure 198. In the GPS mode, the GPS antenna structure 198 is enabled to receive the plurality of inbound GPS RF signals.

In another embodiment, the processing module 180 determines that the wireless communication device 50 is in a radio frequency identification (RFID) mode. In this mode, the processing module 180 converts the outbound data into a fourth outbound symbol stream in accordance with a RFID protocol and converts a fourth inbound symbol stream into the inbound data in accordance with the RFID protocol.

In this mode, the RF transceiver section 182 converts a fourth inbound RF signal into the fourth inbound symbol stream in accordance with a fourth local oscillation and converts the fourth outbound symbol stream into a fourth outbound RF signal in accordance with the fourth local oscillation. The antenna system 54 includes an RFID antenna structure, wherein, when the wireless communication device is in the RFID mode, the RFID antenna structure is enabled to transceive the fourth inbound and outbound RF signals. Note that, in one embodiment, the RFID antenna structure includes a coil for near field communication of the fourth inbound and outbound RF signals.

In yet another embodiment, the processing module 180 generate the operational parameters 188 and/or 236 to include a frequency hopping pattern within a given frequency band. As such, the antenna system 54 adjusts its center frequency in accordance with the frequency hopping pattern to provide a plurality of inbound RF signals to the transceiver section 182.

The transceiver section 182 converts the plurality of inbound RF signals into a plurality of inbound symbol streams.

The processing module 180 receives the plurality of inbound symbol streams in accordance with the frequency hopping pattern and oversamples them to produce a plurality of oversampled inbound symbol streams. The processing module 180 then combines the plurality of oversampled inbound symbol streams to produce a combined oversampled symbol stream. The combining may be done in accordance with an averaging function, a mean square function, with weighting of the symbol streams, and/or any other way to mathematically combine signals. The processing module 180 then converts the combined oversampled symbol stream into the inbound data 72 or 128.

Figure 14:
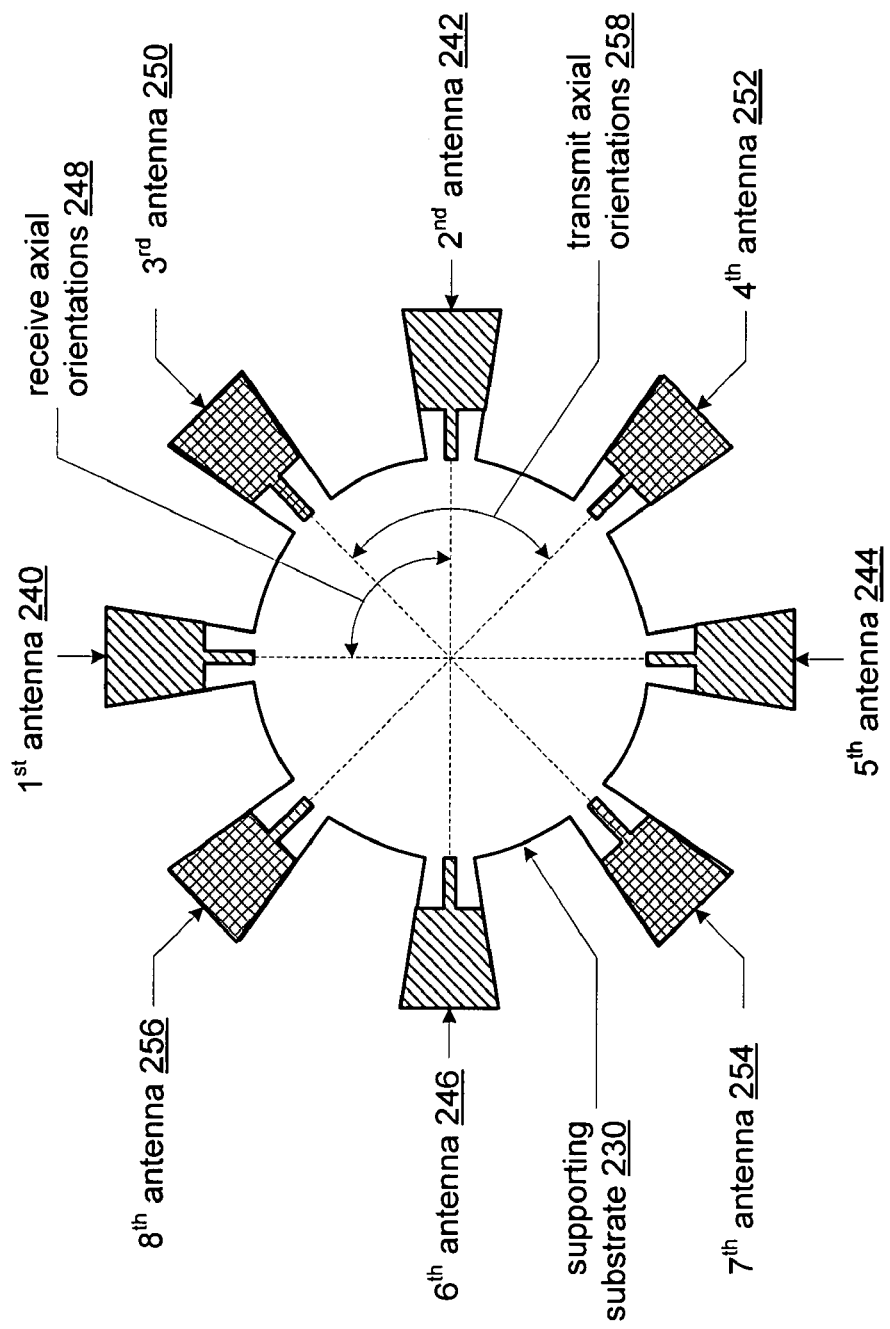
FIG. 14 is a diagram of another embodiment of an antenna system in accordance with the present invention.

FIG. 14 is a diagram of another embodiment of an antenna system 54 that includes a plurality of first antennas 240, 242, 244, and 246 having a first orthogonal orientation therebetween 246 and a plurality of second antennas 250, 252, 254, and 256 having a second orthogonal orientation therebetween 258. In this embodiment, the plurality of second antennas is interspersed with the plurality of first antennas.

In an embodiment, the antenna system 54 includes a plurality of transmit planer antennas 250, 252, 254, and 256 and a plurality of receive planer antennas 240, 242, 244, and 246 on a supporting structure. The supporting substrate may be an integrated circuit package substrate such as a printed circuit board (PCB), a PCB, a low temperature co-fired ceramic (LTCC) substrate, or an organic substrate.

The plurality of transmit planer antennas (e.g., the third, fourth, seventh, and/or eighth antennas 250, 252, 254, and 256) have a plurality of transmit axial orientations 258, where each of the transmit planer antennas is positioned in accordance with a corresponding one of the transmit axial orientations 258. Each of the transmit planer antennas has a conductive antenna pattern on at least the first surface of the supporting substrate 230. For example, the conductive antenna pattern may be a meandering line on the first surface, a metal trace on the first surface, a coil on the first surface, and/or a planer helical antenna as described in co-pending patent application entitled PLANER HELICAL ANTENNA, having a filing date of Mar. 21, 2006, and a Ser. No. 11/386, 247.

The plurality of receive planer antennas (e.g., the first, second, fifth, and sixth antennas 240, 242, 244, and 246) have a plurality of receive axial orientations 248, where each of the receive planer antennas is positioned in accordance with a corresponding one of the receive axial orientations 248. Each of the plurality of receive planer antennas has the conductive antenna pattern on the first surface of the supporting substrate. For example, the conductive antenna pattern may be a meandering line on the first surface, a metal trace on the first surface, a coil on the first surface, and/or a planer helical antenna as described in co-pending patent application entitled PLANER HELICAL ANTENNA, having a filing date of Mar. 21, 2006, and a Ser. No. 11/386,247.

Figure 15:
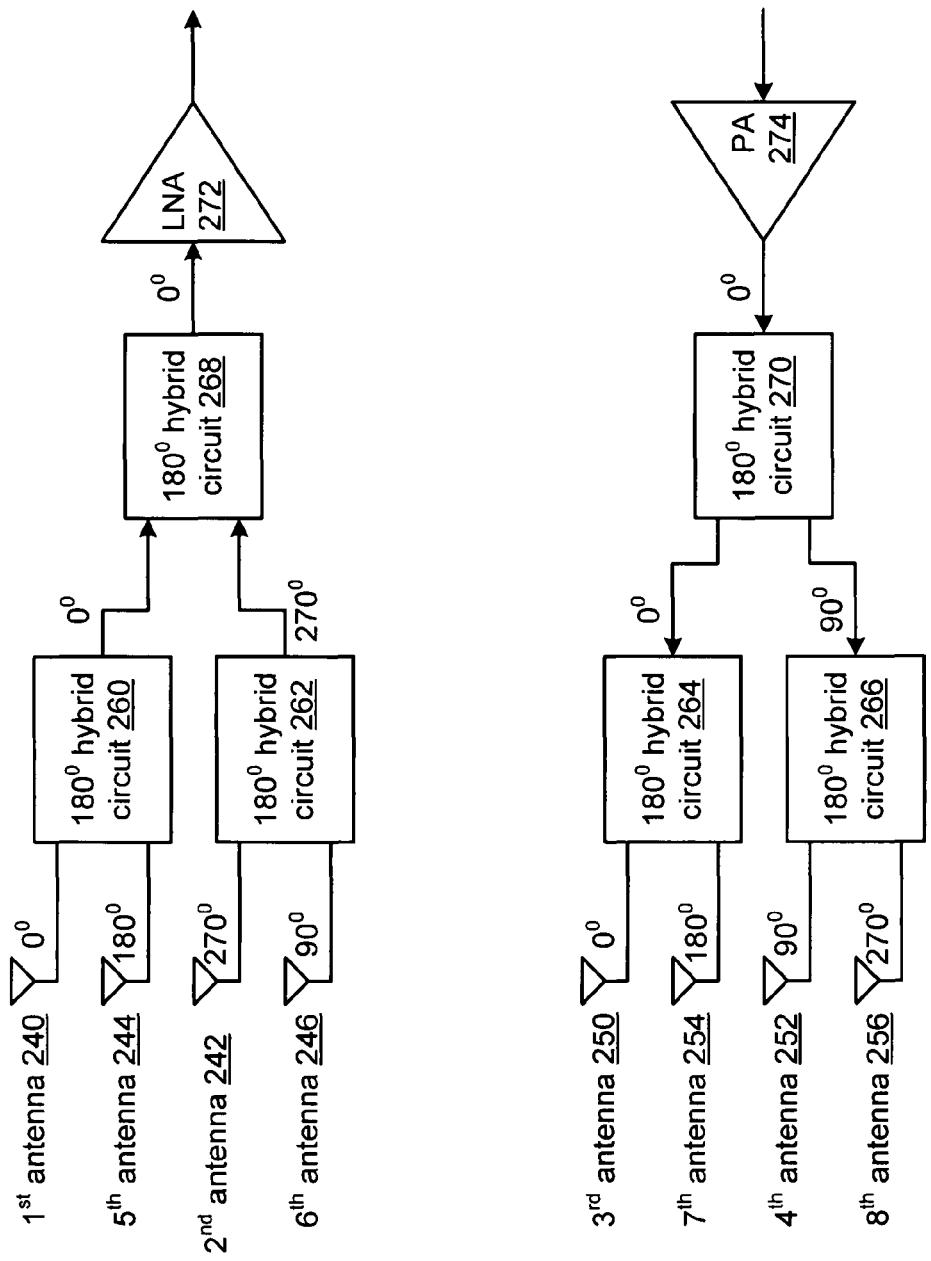
FIG. 15 is a schematic block diagram of another embodiment of an antenna system in accordance with the present invention.

FIG. 15 is a schematic block diagram of another embodiment of an antenna system 54 that includes the plurality of first antennas 240, 242, 244, and 246, the plurality of second antennas 250, 252, 254, and 256, a receive module, and a transmit module. In general, the receive module is coupled to the plurality of first antennas and combines RF signals received by the plurality of first antennas to produce the inbound RF signal. Also in general, the transmit module generates a plurality of outbound RF signals from the outbound RF signal that have an orthogonal phase relationship therebetween and provides the plurality of outbound RF signals to the plurality of second antennas.

In this embodiment, the receive module includes a plurality of hybrid circuits 260, 262, and 268 coupled to an LNA module 272 and the transmit module includes a plurality of hybrid circuits 264, 266, and 270 coupled to a PA module 274.

The first hybrid circuit module 260 is coupled to produce a first phase combined receive RF signal (e.g., 0°) from a first phase shifted receive RF signal (e.g., 0°) received from the 1$^{st}$ antenna 240 and a second phase shifted receive RF signal (e.g., 180°) received from the 5$^{th}$ antenna 244. For example, the first hybrid circuit 260 may perform the function of cos$(2\pi\omega_{RF}+270)$−cos$(2\pi\omega_{RF}+180)$.

The second hybrid circuit module 262 is coupled to produce a second phase combined receive RF signal (e.g., 270°) from a third phase shifted receive RF signal (e.g., 270°) received from the 2$^{nd}$ antenna 242 and a fourth phase shifted receive RF signal (e.g., 90°) received from the 6$^{th}$ antenna 246. For example, the second hybrid circuit 262 may perform the function of cos$(2\pi\omega_{RF}+270)$−cos$(2\pi\omega_{RF}+90)$.

The third hybrid circuit module 268 is coupled to produce a receive RF signal from the first and second phase combined receive RF signals, i.e., the outputs of the first and second hybrid circuits 260 and 262. In one embodiment, the third hybrid circuit 268 performs the function of cos$(2\pi\omega_{RF}+0)$+ 90° phase shift of [cos$(2\pi\omega_{RF}+270)$]. The received RF signal is then amplified by the LNA module 272.

On the transmit side, the PA module 280 is coupled to amplify an outbound RF signal to produce an amplified RF signal. The first hybrid circuit module 270 is coupled to produce a first phase shifted transmit RF signal (e.g., 90°) from a transmit RF signal (i.e., the amplified RF signal). The first hybrid circuit module 270 provides the transmit RF signal (e.g., 0°) to the second hybrid circuit module 264 and the first phase shifted transmit RF signal to the third hybrid circuit module 266. In one embodiment, the first hybrid circuit module 270 functions to add a 90° phase offset to the transmit RF signal (e.g., cos$(2\pi\omega_{RF})$) to produce the first phase shifted transmit RF signal (e.g., cos$(2\pi\omega_{RF}+90)$) and passes the transmit RF signal through a delay that substantially matches the time it takes to add the 90° phase offset.

The second hybrid circuit module 264 is coupled to produce a second phased shifted transmit RF signal (e.g., 180°) from the transmit RF signal (e.g., 0°). The second hybrid circuit module 264 provides the transmit RF signal (e.g., 0°) to the third antenna 250 and provides the second phase shifted transmit RF signal (e.g., 180°) to the 7$^{th}$ antenna 254. In one embodiment, the second hybrid circuit module 264 inverts the transmit RF signal (e.g., cos$(2\pi\omega_{RF})$) to produce the second phase shifted transmit RF signal (e.g., cos$(2\pi\omega_{RF}+180)$) and passes the transmit RF signal through a delay that substantially matches the time it takes to invert the signal.

The third hybrid circuit module 266 is coupled to produce a third phase shifted transmit RF signal (e.g., 270°) from the first phase shifted transmit RF signal (e.g., 90°). The third hybrid circuit module 266 provides the third phase shifted transmit RF signal (e.g., 270°) to the 8$^{th}$ antenna 256 and provides the first phase shifted transmit RF signal (e.g., 90°) to the 4$^{th}$ antenna 252. In one embodiment, the third hybrid circuit module 266 inverts the first phase shifted transmit RF signal (e.g., cos$(2\pi\omega_{RF}+90)$ to produce the third phase shifted transmit RF signal (e.g., cos$(2\pi\omega_{RF}+270)$) and passes the first phase shifted transmit RF signal through a delay that substantially matches the time it takes to invert the signal.

Figure 16:
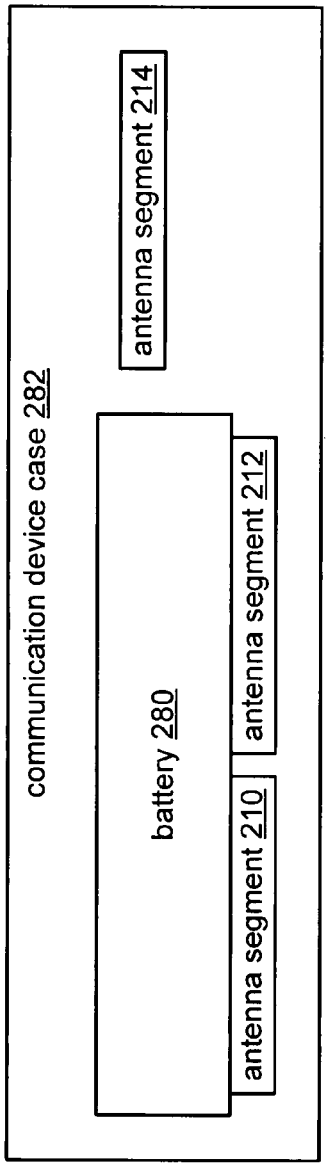
FIG. 16 is a diagram of an embodiment of a wireless communication device in accordance with the present invention.

FIG. 16 is a diagram of an embodiment of a wireless communication device 50 that includes a battery 280, a communication device case 282, and a plurality of antenna segments 210-214. In this embodiment, the battery 280 is coupled to provide power to the IC 52 and at least a portion of the antenna system 54 (e.g., an antenna segment 210-214) is located proximal to the battery 280. In such an embodiment, the battery 280 functions as a ground plane for the at least a portion of the antenna system 54.

Figure 17:
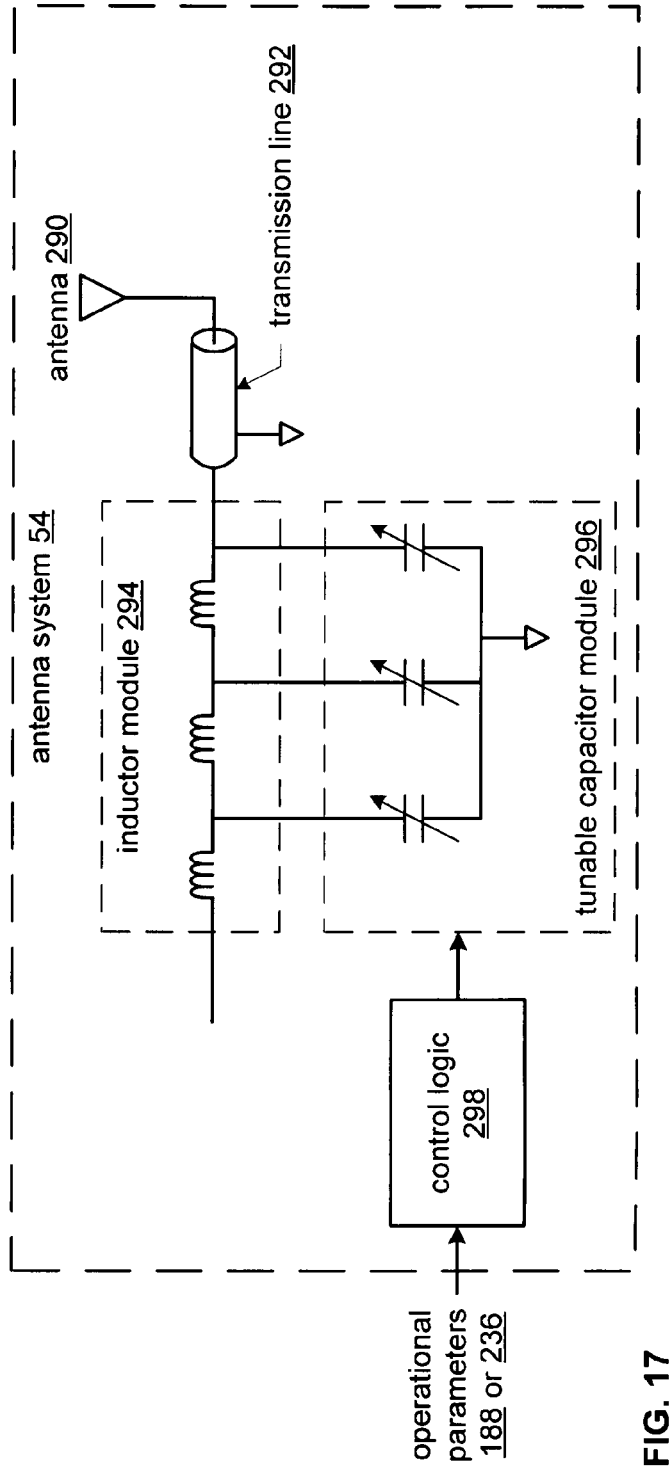
FIG. 17 is a schematic block diagram of another embodiment of an antenna system in accordance with the present invention.

FIG. 17 is a schematic block diagram of another embodiment of an antenna system 54 that includes an antenna 290, a transmission line 292, an inductor module 294, a tunable capacitor module 296, and control logic 298. The antenna 290 may include one or more antenna segments as previously discussed with reference to FIGS. 9-12, may include a dipole antenna, a mono-pole antenna, a diversity antenna structure, an orthogonal antenna structure and/or a combination thereof.

The transmission line 292 provides coupling between the antenna 290 and the rest of the antenna system 54. The transmission line 292 may be a shielded trace on a PCB, on a package substrate of the IC 52, may be a coaxial cable implemented on the IC 52, on the package substrate, and/or on the PCB using micro-electromechanical (MEM) technique and/or a combination thereof. The properties (impedance, frequency response, bandwidth, etc.) of the transmission line 292 may be fixed and/or adjustable in accordance with the operational parameters 188 and/or 236.

The inductor module 294 is coupled to the transmission line 292 and to the tunable capacitor module 296. The opposite end of the inductor module 294, which includes one or more fixed and/or variable inductors, provides the connection node to the transceiver section 182. The tunable capacitor module 296, which includes one or more fixed and/or adjustable capacitors, a capacitor matrix, and/or a capacitor switching network, is adjusted in accordance with a capacitance control signal to provide a desired capacitance. In this manner, the inductance of the inductor module 294 in combination with the desired capacitance tunes the antenna system 54 to provide a desired center frequency, a desired quality factor, a desired impedance, a desired bandwidth, a desired frequency response, a and/or desired gain.

The control logic 298 generates the capacitance control signal based on the operational parameters 188 and/or 236. For example, the control logic 298 may be a state machine coded to convert a particular setting of the operational parameters 188 and/or 236 into a particular setting of the capacitor control signal.

In another embodiment, the inductor module 294 includes an inductor to provide a first inductance and a tunable inductor circuit, which may include an adjustable inductor, an inductor matrix, a switching inductor network and/or a combination thereof. The tunable inductor circuit is coupled to provide a second inductance in accordance with an inductance control signal. In this embodiment, the control logic 298 generates the inductance control signal in accordance with the operational parameter 188 and/or 236. The resulting inductance (e.g., the first and second inductances) in combination with the capacitance of the tunable capacitor module 296 provides the tuning of the antenna system 54. Note that in one embodiment, adjusting of the capacitor module 296 adjusts the center frequency of the antenna system 54 and adjusting of the inductor module 294 adjusts the bandwidth of the antenna system 54.

In an embodiment, the wireless communication device 50 includes the IC 52 and a printed circuit board (PCB). The IC 52 includes the processing module 180, the transceiver section 182, the control logic 298, the tunable capacitor module 296, and the tunable inductor circuit of the inductor module 294. The PCB supports the integrated circuit 52 and the inductor of the inductor module 294. The antenna 290 is printed on the printed circuit board. Such a wireless communication device may be incorporated into another device (e.g., PC, cell phone, etc.).

In another embodiment, the wireless communication device 50 includes an IC 52 and a PCB. In this embodiment, the IC 52 includes a package board and a die. The die includes the processing module 180, the transceiver section 182, the control logic 298, and the tunable capacitor module 296. The package board includes the tunable inductor circuit and the inductor of the inductor module 294. The printed circuit board supports the integrated circuit and the antenna 290.

Figure 18:
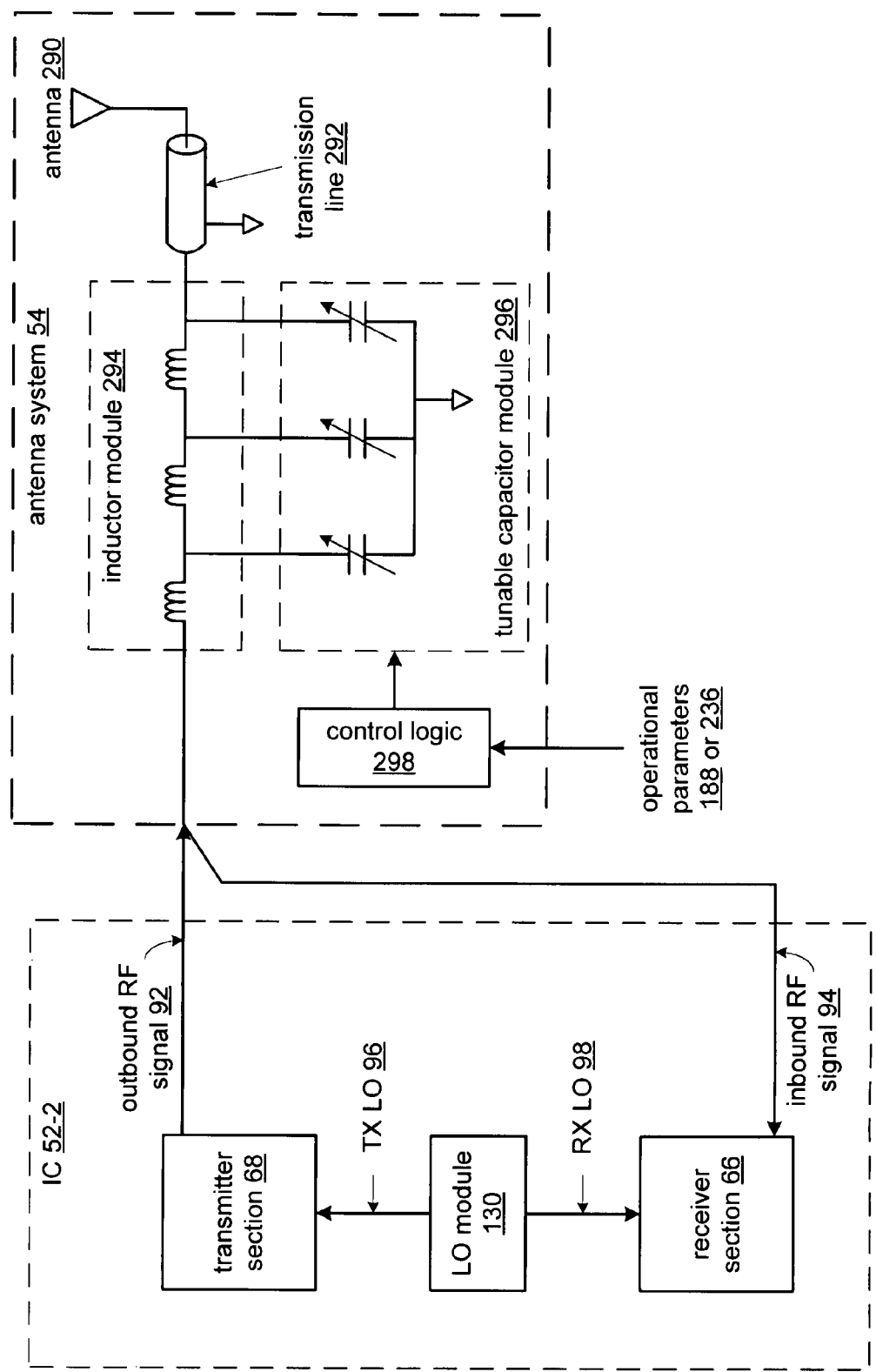
FIG. 18 is a schematic block diagram of another embodiment of a wireless communication device in accordance with the present invention.

FIG. 18 is a schematic block diagram of another embodiment of a wireless communication device 50 that includes an IC 52-2 and an antenna system 54. The IC 52-2 functions as previously discussed with reference to FIG. 7 and the antenna system 54 functions as previously discussed with reference to FIG. 17.

Figure 19:
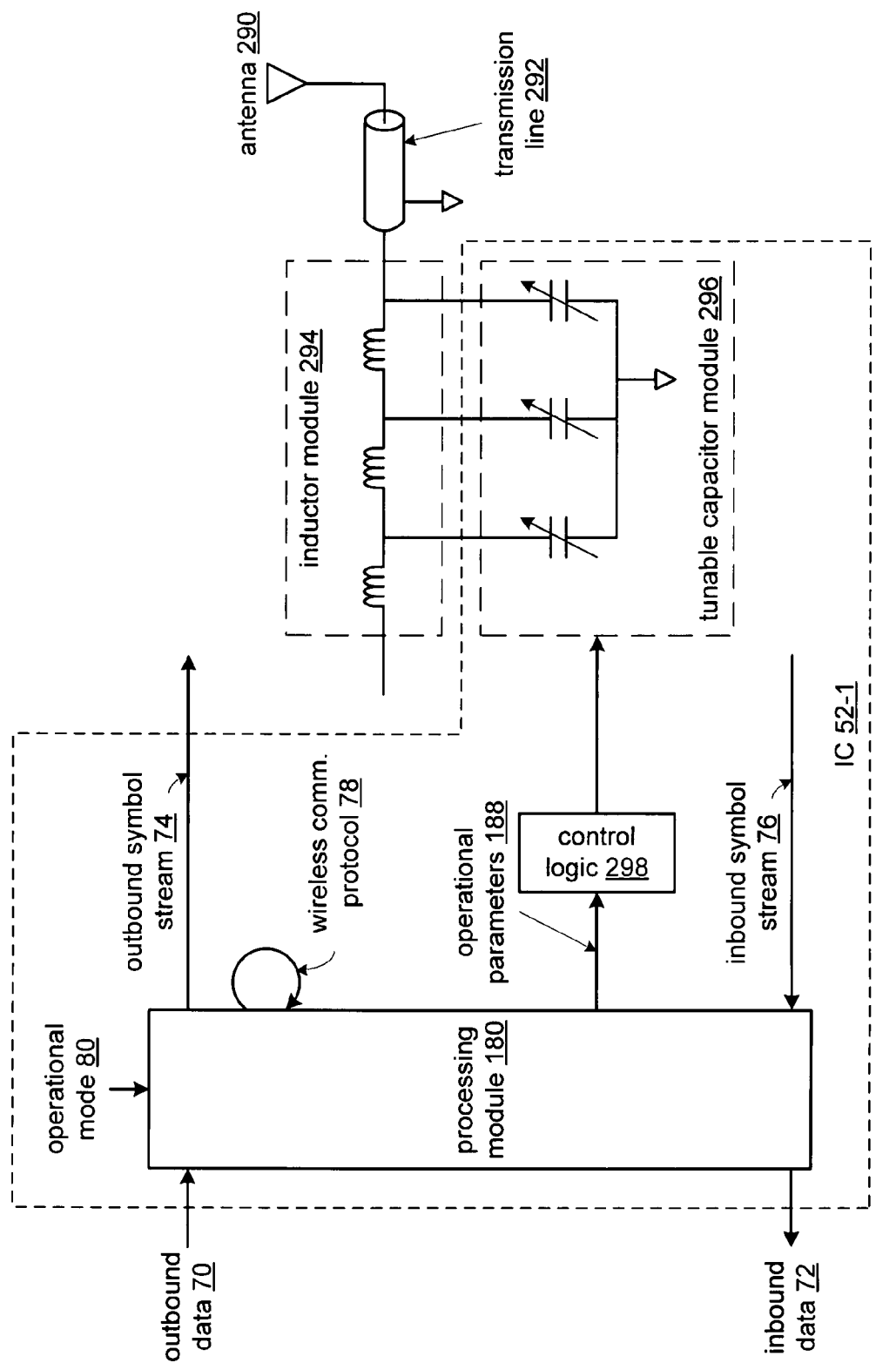
FIG. 19 is a schematic block diagram of another embodiment of a wireless communication device in accordance with the present invention.

FIG. 19 is a schematic block diagram of another embodiment of a wireless communication device 50 that includes an IC 52-1 and an antenna system 54. In this embodiment, the IC 52-1 includes the processing module 180, the control logic of the antenna system 54, and the tunable capacitor module 296 of the antenna system. The processing module 180 functions as previously discussed with reference to FIGS. 8 and 13. The antenna system 54 functions as previously described with reference to FIG. 17.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A wireless communication device comprises:
   an integrated circuit (IC) that includes:
      a processing module coupled to:
         establish a wireless communication protocol in accordance with one of a plurality of operational modes of the wireless communication device;
         convert outbound data into an outbound symbol stream in accordance with the wireless communication protocol;
         convert an inbound symbol stream into inbound data in accordance with the wireless communication protocol; and
         establish operational parameters based on the wireless communication protocol; and
      a transceiver section coupled to:
         convert an inbound RF signal into the inbound symbol stream in accordance with the operational parameters and a local oscillation; and
         convert the outbound symbol stream into an outbound RF signal in accordance with the operational parameters and the local oscillation; and
   an antenna system that provides a plurality of antenna structures corresponding to the plurality of operational modes of the wireless communication device, wherein the antenna system provides one of the plurality of antenna structures in accordance with the operational parameters to transceive the inbound and outbound RF signals.

2. The wireless communication device of claim 1, wherein the wireless communication protocol comprises at least one of:
   a wide bandwidth code division multiplexing (WCDMA) protocol;
   a high-speed downlink packet access (HSDPA) protocol;
   a high-speed uplink packet access (HSUPA) protocol;
   a global system for mobile communications (GSM) protocol;
   a radio frequency identification (RFID) protocol;
   an Enhanced Data rates for GSM Evolution (EDGE) protocol;
   a General Packet Radio Service (GPRS) protocol;
   a wireless local area network (WLAN) protocol;
   a wireless personal area network (WPAN) protocol;
   a global positioning system (GPS) protocol;
   a digital video broadcasting-handheld (DVB-H) protocol;
   a digital multimedia broadcasting (DMB) protocol;
   a frequency modulation (FM) radio protocol; and
   a near field communication (NFC) protocol.

3. The wireless communication device of claim 2, wherein the antenna system comprises at least two of:
   a WCDMA antenna structure;
   an HSDPA antenna structure;
   an HSUPA antenna structure;
   a GSM antenna structure;
   an RFID antenna structure;
   an EDGE antenna structure;
   a GPRS antenna structure;
   a WLAN antenna structure;
   a WPAN antenna structure;
   a GPS antenna structure;
   a DVB-H antenna structure;
   a DMB antenna structure;
   an FM antenna structure; and
   an NFC coil structure.

4. The wireless communication device of claim 1, wherein the operational parameters comprises at least two of:
   a frequency band in accordance with the wireless communication protocol;
   a channel within the frequency band;
   channel bandwidth of the channel;
   interferer frequency;
   antenna radiation pattern;
   full duplex communication;
   half duplex communication;
   gain setting;
   impedance setting;
   attenuation setting;
   attenuation roll-off;
   antenna quality factor;
   antenna polarization setting; and
   antenna diversity setting.

5. The wireless communication device of claim 4, wherein the antenna system comprises:
   a plurality of antenna segments;
   configuration circuitry coupled to configure at least one of the plurality of antenna segments into an antenna structure in accordance with at least one of the frequency band of the wireless communication protocol, the channel, and the channel bandwidth; and
   compensation circuitry coupled to the antenna structure to adjust a characteristic of the antenna structure in accordance with at least one of: the antenna radiation pattern, the gain setting, the impedance setting, the attenuation setting, the attenuation roll-off, the antenna quality factor, the antenna polarization setting, and the antenna diversity setting.

6. The wireless communication device of claim 1 further comprises:
   the processing module coupled to:
      establish a first wireless communication protocol and a second wireless communication protocol in accordance with two of the plurality of operational modes of the wireless communication device;
      convert first outbound data into a first outbound symbol stream in accordance with the first wireless communication protocol;
      convert a first inbound symbol stream into first inbound data in accordance with the first wireless communication protocol;

establish first operational parameters based on the first wireless communication protocol;
convert second outbound data into a second outbound symbol stream in accordance with the second wireless communication protocol;
convert a second inbound symbol stream into second inbound data in accordance with the second wireless communication protocol; and
establish second operational parameters based on the second wireless communication protocol; and the transceiver section coupled to:
convert a first inbound RF signal into the first inbound symbol stream in accordance with the first operational parameters and a first local oscillation;
convert the first outbound symbol stream into a first outbound RF signal in accordance with the first operational parameters and the first local oscillation;
convert a second inbound RF signal into the second inbound symbol stream in accordance with the second operational parameters and a second local oscillation; and
convert the second outbound symbol stream into a second outbound RF signal in accordance with the second operational parameters and the second local oscillation;

the antenna system having a first antenna structure enabled in accordance with the first operational parameters to transceive the first inbound and outbound RF signals and having a second antenna structure enabled in accordance with the second operational parameters to transceive the second inbound and outbound RF signals.

7. The wireless communication device of claim 1, wherein the antenna system comprises:
a plurality of first antennas having a first orthogonal orientation therebetween;
a plurality of second antennas having a second orthogonal orientation therebetween, wherein the plurality of second antennas is interspersed with the plurality of first antennas;
a receive module coupled to the plurality of first antennas, wherein the receive module combines RF signals received by the plurality of first antennas to produce the inbound RF signal; and
a transmit module coupled to the plurality of second antennas, wherein the transmit module generates a plurality of outbound RF signals from the outbound RF signal, wherein the plurality of outbound RF signals have an orthogonal phase relationship therebetween, and wherein the transmit module provides the plurality of outbound RF signals to the plurality of second antennas.

8. The wireless communication device of claim 1 further comprises:
a battery coupled to provide power to the IC, wherein at least a portion of the antenna system is located proximal to the battery and wherein the battery functions as a ground plane for the at least a portion of the antenna system.

9. A wireless communication device comprises:
a processing module coupled to:
determine whether the wireless communication device is in at least one of: a wireless wide area network (WWAN) mode and a wireless local area network (WLAN) mode,
when the wireless communication device is in the WWAN mode:
convert outbound data into a first outbound symbol stream in accordance with a WWAN protocol;
convert a first inbound symbol stream into inbound data in accordance with the WWAN protocol;
when the wireless communication device is in the WLAN mode:
convert the outbound data into a second outbound symbol stream in accordance with a WLAN protocol;
convert a second inbound symbol stream into the inbound data in accordance with the WLAN protocol;

a transceiver section coupled to:
when the wireless communication device is in the WWAN mode:
convert a first inbound RF signal into the first inbound symbol stream in accordance with a first local oscillation; and
convert the first outbound symbol stream into a first outbound RF signal in accordance with the first local oscillation;
when the wireless communication device is in the WLAN mode:
convert a second inbound RF signal into the second inbound symbol stream in accordance with a second local oscillation; and
convert the second outbound symbol stream into a second outbound RF signal in accordance with the second local oscillation;

an antenna system having a WWAN antenna structure and a WLAN antenna structure, wherein, when the wireless communication device is in the WWAN mode, the WWAN antenna structure is enabled to transceive the first inbound and outbound RF signals and, when the wireless communication device is in the WLAN mode, the WLAN antenna structure is enabled to transceive the second inbound and outbound RF signals.

10. The wireless communication device of claim 9 further comprises:
the processing module determining that the wireless communication device is in a wireless personal area network (WPAN) mode, wherein the processing module functions to:
convert the outbound data into a third outbound symbol stream in accordance with a WPAN protocol;
convert a third inbound symbol stream into the inbound data in accordance with the WPAN protocol;
the RF transceiver section, when the wireless communication device is in the WPAN mode, further functions to:
convert a third inbound RF signal into the third inbound symbol stream in accordance with a third local oscillation; and
convert the third outbound symbol stream into a third outbound RF signal in accordance with the third local oscillation; and
the antenna system having a WPAN antenna structure, wherein, when the wireless communication device is in the WPAN mode, the WPAN antenna structure is enabled to transceive the third inbound and outbound RF signals.

11. The wireless communication device of claim 9 further comprises:
the processing module determining that the wireless communication device is in a global position system (GPS) mode, wherein the processing module further functions to:
convert a plurality of inbound GPS signals into the inbound data in accordance with the GPS protocol;

the RF transceiver section, when the wireless communication device is in the GPS mode, further functions to convert a plurality of inbound GPS RF signals into the plurality of inbound GPS signals; and the antenna system having a GPS antenna structure, wherein, when the wireless communication device is in the GPS mode, the GPS antenna structure is enabled to receive the plurality of inbound GPS RF signals.

12. The wireless communication device of claim 9 further comprises:

the processing module determining that the wireless communication device is in a radio frequency identification (RFID) mode, wherein the processing module functions to:

convert the outbound data into a fourth outbound symbol stream in accordance with a RFID protocol;

convert a fourth inbound symbol stream into the inbound data in accordance with the RFID protocol;

the RF transceiver section, when the wireless communication device is in the RFID mode, further functions to:

convert a fourth inbound RF signal into the fourth inbound symbol stream in accordance with a fourth local oscillation; and convert the fourth outbound symbol stream into a fourth outbound RF signal in accordance with the fourth local oscillation; and the antenna system having an RFID antenna structure, wherein, when the wireless communication device is in the RFID mode, the RFID antenna structure is enabled to transceive the fourth inbound and outbound RF signals.

13. The wireless communication device of claim 12, wherein the RFID antenna structure comprises:

a coil for near field communication of the fourth inbound and outbound RF signals.

14. The wireless communication device of claim 9 further comprises:

an integrated circuit that includes the processing module and the RF transceiver section.

15. The wireless communication device of claim 14, wherein the antenna system further comprises:

an antenna element of at least one of the WWAN antenna structure and the WLAN antenna structure is located on a package substrate of the integrated circuit.

* * * * *

UNITED STATES PATENT AND TRADEMARK OFFICE
CERTIFICATE OF CORRECTION

PATENT NO. : 7,844,242 B2  
APPLICATION NO. : 11/729270  
DATED : November 30, 2010  
INVENTOR(S) : Ahmadreza Rofougaran et al.

Page 1 of 1

It is certified that error appears in the above-identified patent and that said Letters Patent is hereby corrected as shown below:

Title Page, Related U.S. Application Data,
Insert Item --(60)  Provisional application No. 60/906,986, filed on Mar. 14, 2007.--

Col. 30, in Claim 4, line 24, replace "comprises" with --comprise--

Signed and Sealed this
Twenty-first Day of August, 2012

David J. Kappos
*Director of the United States Patent and Trademark Office*